(12) United States Patent
Nasu et al.

(10) Patent No.: US 6,856,633 B2
(45) Date of Patent: Feb. 15, 2005

(54) OPTICAL MODULE, TRANSMITTER AND WDM TRANSMITTING DEVICE

(75) Inventors: Hideyuki Nasu, Chiyoda-ku (JP); Takehiko Nomura, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 9 days.

(21) Appl. No.: 10/032,450

(22) Filed: Jan. 2, 2002

(65) Prior Publication Data

US 2002/0186729 A1 Dec. 12, 2002

(30) Foreign Application Priority Data

Jun. 7, 2001 (JP) ........................................ 2001-173150
Sep. 28, 2001 (JP) ........................................ 2001-300529

(51) Int. Cl.$^7$ ................................................. H01S 3/04
(52) U.S. Cl. ........................................................ 372/34
(58) Field of Search ............................... 372/34–36, 32; 702/102

(56) References Cited

U.S. PATENT DOCUMENTS

| 4,845,647 | A | * | 7/1989 | Dils et al. ..................... 702/102 |
| 4,998,256 | A |   | 3/1991 | Ohshima et al. |
| 5,867,513 | A | * | 2/1999 | Sato ............................. 372/32 |
| 6,122,301 | A | * | 9/2000 | Tei et al. ...................... 372/32 |
| 6,198,757 | B1 | * | 3/2001 | Broutin et al. ................ 372/32 |
| 6,291,813 | B1 |   | 9/2001 | Ackerman et al. |

FOREIGN PATENT DOCUMENTS

| EP | 106 9658 | 1/2001 |
| JP | 2000-056185 | 2/2000 |

OTHER PUBLICATIONS

Villeneuve et al., "High-stability wavelength-controlled DFB-laser sources for dense WDM applications," Optical Fiber Communication (OFC) conference Technical Digest, Mar. 20, 2001.

Tatsuno et al., "50GHz spacing, multi-wavelength tunable locker integrated in a transmitter module with a monolithic-modulator and a DFB-laser," OFC Technical Digest TuB5–1, Mar. 20, 2001.

Adams et al., "Module-packaged tunable laser and wavelength locker delivering 40mW of fibre-coupled power on 34 channels," Electronics Letters vol. 37, No. 11, 691–692, 24$^{th}$ May, 2001.

* cited by examiner

Primary Examiner—Don Wong
Assistant Examiner—Hung Tran Vy
(74) Attorney, Agent, or Firm—Oblon, Spivak, McClelland, Maier & Neustadt, P.C.

(57) ABSTRACT

A transmitting device includes a light-emitting device for outputting a laser beam, a temperature regulator for regulating the temperature in the light-emitting device, a wavelength monitor device for receiving the laser beam from the light-emitting device after it has passed through a optical filter thermally coupled with the light-emitting device, a control unit for controlling the temperature in the temperature regulator based on the signal outputted from the wavelength monitor device such that the lasing wavelength in the laser beam outputted from the light-emitting device will be locked at a predetermined locked wavelength, a temperature-sensing unit for sensing the temperature in the optical filter, and a correcting unit for outputting a correction signal toward the control unit based on the temperature sensed by the temperature-sensing unit, the correction signal being operative to command the correction of any deviation in the locked wavelength associated with the temperature characteristic in the optical filter. The light-emitting device, wavelength monitor device, temperature regulator and optical fiber together define an optical module.

51 Claims, 29 Drawing Sheets

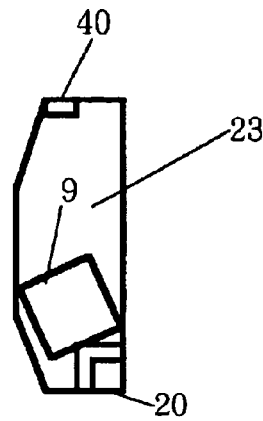
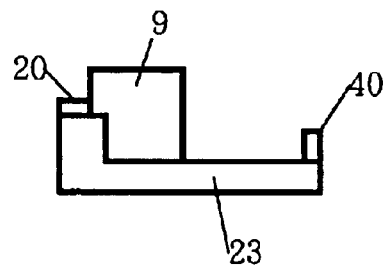
Fig.12 (A)  Fig.12 (B)
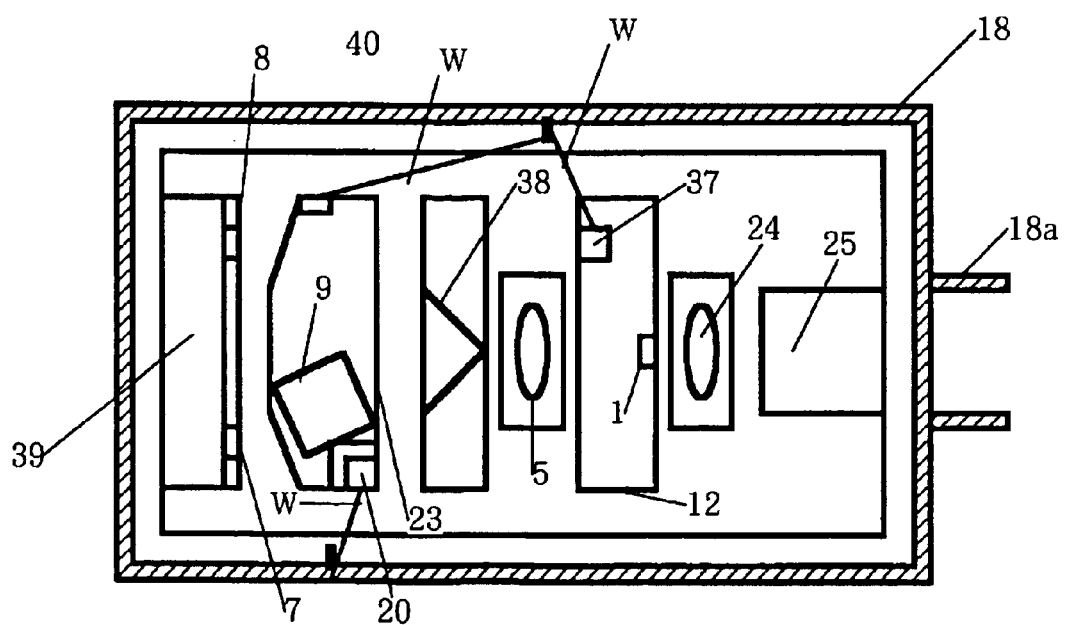
Fig.12 (C)

OPTICAL MODULE, TRANSMITTER AND WDM TRANSMITTING DEVICE

BACKGROUND OF THE INVENTION

1. Field of the Invention

The present invention relates to an optical module, transmitter and WDM transmitting device that are used in the wavelength division multiplexing (WDM) communication system. In the field of dense WDM, it is generally required that the optical signals are stable in wavelength for a long time period. Thus, a technique of causing the optical module to have a wavelength monitoring function has been developed.

2. Discussion of the Background

One of the prior art documents that discloses an optical module having a wavelength monitoring function is Japanese Patent Laid-Open Application No. Hei 12-56185. Referring first to FIG. 20, there is shown an optical module constructed according to the prior art. As shown in FIG. 20, the optical module includes a light-emitting device 50 including a semiconductor laser diode or the like for outputting a laser beam with a predetermined wavelength; an optical fiber 51 optically coupled with the light-emitting device 50 and adapted to externally deliver the laser beam output from the light-emitting device 50 at its front facet (right side as viewed in FIG. 20); an optical filter 52 having a cutoff wavelength substantially equal to the lasing wavelength of the light-emitting device 50; a beam splitter 53 including a half mirror for dividing a monitoring laser beam output from the light-emitting device 50 at its back facet (left side as viewed in FIG. 20) into two laser beam components; a first photo detector 54 including a photodiode or the like for receiving one of the two laser beam components divided by the beam splitter 53 after it has passed through the optical filter 52; a second photo detector 55 including a photodiode or the like for receiving the other laser beam component from the beam splitter 53; and a Peltier module 56 for regulating the temperature in the light-emitting device 50. A control unit 57 is connected to this optical module and adapted to control the Peltier module 50 to control the wavelength in the light-emitting device 50, based on PD currents outputted from the first and second photo detectors 54, 55.

FIG. 21 is a block diagram of a layout relating to the control unit 57. As shown in FIG. 21, the control unit 57 may have a first transformer 67 for transforming a first PD current outputted from the first photo detector 54 into a first voltage V1, a second transformer 68 for transforming a second PC current outputted from the second photo detector 55 into a second voltage V2, a comparator 69 for comparing the first voltage V1 from the first transformer 67 with the second voltage V2 from the second transformer 68 and for outputting the difference between these two voltages as a control signal, and a thermo electric cooler (TEC) type current generator 70 for outputting a temperature control current used to raise or lower the temperature in the Peltier module 56.

Between the light-emitting device 50 and the optical fiber 51 is disposed a condensing lens 58 for coupling the laser beam from the front facet of the light-emitting device 50 with the optical fiber 51. Between the light-emitting device 50 and the beam splitter 53 is disposed a collimating lens 59 for collimating the laser beam outputted from the back facet of the light-emitting device 50.

The light-emitting device 50, condensing lens 58 and collimating lens 59 are fixedly mounted on a LD carrier 60.

The first and second photo detectors 54, 55 are fixedly mounted on first and second PD carriers 61, 62, respectively.

The beam splitter 53, optical filter 52 and first and second PD carriers 61, 62 are fixedly mounted on a metallic base 63, which is in turn fixedly mounted on the surface of the LD carrier 60. This LD carrier 60 is fixedly mounted on the Peltier module 56.

The light-emitting device 50, beam splitter 53, optical filter 52, condensing lens 58, collimating lens 59, LD carrier 60, first PD carrier 61, second PD carrier 62, metallic base 63 and Peltier module 56 are housed within a package 64. A ferrule 65 for holding the tip end of the optical fiber 51 is fixedly mounted on the package 64 at one side through a sleeve 66.

The laser beam that is output from the front facet of the light-emitting device 50 is condensed by the condensing lens 58 into the optical fiber 51 held by the ferrule 65 and externally delivered therefrom.

On the other hand, the laser beam outputted from the back facet of the light-emitting device 50 is collimated by the collimating lens 59 and then divided by the beam splitter 53 into two laser beam components, one being directed in the direction of Z-axis (or transmission) and the other being directed in the direction of X-axis perpendicular to the direction of Z-axis (or reflection). The laser beam component directed in the direction of Z-axis is received by the first photo detector 54 while the laser beam component directed in the direction of X-axis is received by the second photo detector 55.

PD currents outputted from the first and second photo detectors 54, 55 are fed into the control unit 57 which in turn controls the temperature in the Peltier module 56 to control the wavelength in the light-emitting device 50, based on the inputted PD currents.

FIG. 22 is a graph illustrating the age degradation of a laser diode. As shown in FIG. 22, the threshold value in the optical module including the laser diode is Ith when it is initially driven. An auto power control (APC) circuit for driving the optical module to provide a predetermined optical output Pf is provided.

When the optical module is initially driven, a current injected into the laser diode to provide the optical output Pf is Iop. As the laser diode is used for a prolonged time period, its characteristic will be degraded. Thus, the threshold value on termination of a predetermined time period will be raised to Ith'. Moreover, the injection current into the laser diode will be raised to Iop'.

As shown in FIG. 23, the lasing wavelength in the laser diode has a dependency on injection current if the temperature in the LD carrier (sub-mount) is constant. This dependency is usually at about 0.01 nm/mA. Therefore, the lasing wavelength will be shifted toward longer wavelength if the temperature at the LD carrier is constant and when the age degradation in the laser diode occurs.

The optical filter is used for locking the wavelength in the laser diode having such a characteristic. In other words, the temperature in the LD carrier on which the laser diode is placed is regulated by the Peltier module while monitoring the wavelength. The lasing wavelength in the optical module is then fixed to such a wavelength locking point P as shown in FIG. 24. As the injection current increases due to the age degradation of the laser diode, the temperature in the laser diode at its active layer will increase and cause a shift in the lasing wavelength toward longer wavelengths. However, as will be discussed more fully below, the wavelength shift can be compensated by driving the wavelength monitor using the optical filter. Moreover, temperature-dependent changes in the optical filter characteristic can be compensated for by the controller, which in turn controls the cooling level imparted by the Peltier module on all of the components mounted to it. Thus, the temperature in the LD carrier can be lowered by the Peltier module, as can the operational characteristics of the optical filter.

Now, the optical filter is formed, for example, from fused silica. This means that it has a temperature dependency relating to its light transmission (which will be simply referred to "temperature characteristic"). For example, an optical filter may have its characteristic of wavelength-light transmission which is shifted toward shorter wavelength at a rate of 0.01 nm/° C.

In the optical module of the prior art, the light-emitting device 50 may thermally be coupled with the optical filter 52 to maintain substantially the same temperature therein, as shown in FIG. 20. Thus, the temperature in the optical filter 52 will decrease as the temperature in the LD carrier 60 on which the light-emitting device 50 is mounted decreases. Thus, the characteristic in the optical filter 52 will also be changed. In other words, as the performance of the light-emitting device 50 is degraded with time during a predetermined time period after the wavelength monitor has been driven, the injection current into the light-emitting device 50 will increase so as to produce a constant output power, but this increase in injection current also raises the temperature therein. To compensate the wavelength thus deviated, the control unit 57 is driven to control the Peltier module 56 to lower the temperature in the light-emitting device 50, although when changed the temperature in the optical filter 52 will decrease as well. When the temperature in the optical filter decreases, the initial wavelength characteristic will not be provided.

As shown in FIG. 25, thus, the optical filter characteristic will wholly be shifted toward shorter wavelengths. In FIG. 25, black circles indicate initial locked wavelengths P and white circles denote locked wavelengths after the LD driven for a predetermined time period. Thus, the present inventors recognized that the conventional LD module according to the prior art could not provide a laser beam having its desired wavelength since the locked wavelength has been shifted from P to P'. The present inventors further recognized that the relationship between the injection current and the locked wavelength when the wavelength monitor is driven is shown in FIG. 26, showing that the lasing wavelength has a current dependency.

Even when the Peltier module 56 on which the optical filter is mounted is controlled to have its temperature constant, the temperature in the optical module will be varied depending on the change in the external ambient temperature and power consumption in the optical module. Thus, the characteristic performance of the optical filter will be directly influenced by the change in the current temperature through the side thereof which is not in direct contact with the Peltier module. For example, the present inventors observed that the temperature in the optical filter may vary as shown in FIG. 28.

Such a deviation associated with the change of temperature in the optical filter causes the degradation of signal quality through crosstalk and is undesirable for dense WDM systems that require stable wavelengths to operate efficiently and reliably.

Since dense WDM systems use a narrow spacing between optical signal wavelengths, it is under a severe requirement for prevention of the deviation in the wavelength of the respective optical signals. Therefore, higher quality WDM systems use fixed lasing wavelengths, which ensure increased accuracy and signal separation. For example, if optical signals are to be arrayed using an etalon filter having such a wavelength discrimination characteristic as shown in FIG. 27 as an optical filter, the etalon filter must be configured to have a slope having its central or near point overlapped on a predetermined wavelength so that the optical signals are arrayed with a fixed spacing of wavelength. The characteristics of etalon filters are described in section 4 of Yariv, A., "*Optical Electronics in Modern Communication,*" fifth edition, Oxford University Press, Inc., 1997, the entire contents of which being incorporated herein by reference.

European Patent Application EP1069658 describes a technique of sensing the temperature of an etalon filter and feeds a correction signal from a correction unit to a control unit to compensate the temperature. Generally, the etalon filter has a temperature characteristic. A material used for forming the etalon and having its smaller temperature characteristic is crystal. The crystal has been used even in the aforementioned European Patent Application EP 1069658. The temperature characteristic in the crystal etalon is known to be 5 pm/° C.

The casing temperature in the package used for the optical module must range between −5 and 70° C. Thus, the drift due to the temperature of the etalon filter becomes 5 pm/° ×75° C.=375 pm.

When the temperature in a temperature regulator on which the optical filter is mounted is changed, the drift due to the variation of temperature in the etalon filter will further be increased.

FIG. 29 shows the relationship between the locked wavelength and the locking point on slope if a crystal etalon having a spacing of 100 GHz (800 pm) is used to lock the wavelength and to perform the temperature compensation. The temperature compensation enables the locked wavelength and the locking point on slope to be active on slope.

On the other hand, the field of WDM and particularly dense WDM requires a great number of laser modules having different light-emitting wavelengths. It is not realistic to produce all of such laser modules with their different specifications. It is desirable that one laser module can be regulated to accommodate itself to several necessary wavelengths or at least two wavelengths. To enable such a regulation of wavelength, the effective material for the optical filter used in the wavelength monitor is the etalon that has a repeated cycle of wavelength transmission relative to the wavelength of the necessary laser beam.

However, it is impossible that a wavelength in the repeated cycle of wavelength transmission on the optical filter on which the light-emitting wavelength of the laser is positioned is judged from the signal from the wavelength monitor.

To make it possible, it is required that the laser light-emitting wavelength is controlled to be within a predetermined range of wavelength which can be pre-regulated by the wavelength monitor. When it is wanted to control the light-emitting wavelength of a light-emitting device through a temperature regulator on which the light-emitting device is mounted, the temperature in the light-emitting device must accurately be measured and controlled. It is thus required to place a temperature-sensing unit adjacent to the light-emitting device.

The temperature around the light-emitting device varies depending on the injection current into the light-emitting device or the like. There is also a temperature distribution since the optical filter is spatially spaced apart from the light-emitting device even though they are within the same package and on the same temperature regulator. It is thus difficult that the temperature of the optical filter is compensated based on the result measured by the same temperature-sensing unit.

It is now assumed that the lock point is in the center of the slope at the intermediate temperature, 32.5° C. In such a case, the temperature of the etalon is on a point in the lower and gentler section of the slope at −5° C. and on the maximum value of the photo detector at 70° C. The wavelength locking detects which side of the slope the wavelength drifts on. Therefore, the locking will not sufficiently be performed on the illustrated lower and higher temperature sides. Particularly, the lock point will move to the adjacent slope beyond the peak of the wavelength discrimination. It is thus impossible that the wavelength locking is performed by executing the temperature compensation of a short-cycle etalon filter used in such a dense WDM system. If the spacing of wavelength is gradually reduced to 50 GHz, 25 GHz, 12.5 GHz and etc. to improve the capacity of transmission, the range in which the locking can be made apparently become narrower than the range of temperature compensation, 345 pm. The wavelength locking cannot further be performed.

For such a reason, the dense WDM system having its reduced spacing of wavelength must suppress the wavelength drift within several pm. The conventional optical modules and transmitters could not fulfill the aforementioned requirements since they had had 10 pm only on the casing temperature dependency.

Since the optical module is temperature controlled only through the bottom thereof, each of the parts thereof will have a temperature distribution. Particularly, the etalon filter must have its magnitude equal to or larger than 1 mm since the characteristic of transmission wavelength is determined by the length of the filter along the optical axis and since the filter must have its incident area equal to or larger than the diameter of the incident beam.

In the crystal etalon filter which has its thermal conductivity smaller than those of the metals, the thermal conductivity along the optical axis is equal to 0.0255 Cal/cm-sec-deg while the thermal conductivity along a direction perpendicular to the optical axis, that is, a direction perpendicular to the regulation face of the temperature regulator is smaller, 0.0148 Cal/cm-sec-deg. This makes the control of the temperature regulator difficult and tends to create a temperature distribution in comparison with the other parts such as the light-emitting device and so on.

SUMMARY OF THE INVENTION

One aspect of the present invention is to address the above-identified and other deficiencies and limitations associated with conventional optical module devices and optical transmission methods.

In contrast to the prior art, the present invention provides an optical module, transmitter and WDM transmitting device that can simply and easily compensate any deviation in the locked wavelength associated with the temperature characteristic exhibited by the optical filter to stabilize the lasing wavelength of the laser beam with increased accuracy, over the useful life of the laser module.

The present invention also provides an optical module, transmitter and WDM transmitting device that can more accurately be fixed at a predetermined locked wavelength even if the wavelength spacing of the respective laser beams in the WDM system is particularly narrow (e.g., 100 GHz or less) and when the optical filter is influenced by the casing temperature.

The present invention further provides an optical module, transmitter and WDM transmitting device that can more accurately be fixed at a predetermined locked wavelength even if an optical filter tending to create a temperature distribution is used. To this end selected features of the present invention include a light-emitting device for outputting a laser beam;

a first temperature-sensing unit disposed adjacent to the light-emitting device and adapted to sense the temperature in the light-emitting device;

a wavelength monitor for receiving the laser beam outputted from the light-emitting device before it passes through an optical filter and for monitoring the wavelength in the laser beam;

a wavelength regulating unit for receiving a signal outputted from the wavelength monitor and for regulating the wavelength in the laser beam outputted from the light-emitting device, based on the signal;

a second temperature-sensing unit disposed directly on or adjacent to the optical filter for sensing the temperature in the optical filter, and a temperature control unit for regulating the temperature in the light-emitting device or the wavelength monitor, at least a portion of the wavelength monitor being in contact with the temperature control unit.

Another aspect of the present invention is that it may be embodied in a transmitter that includes an optical module;

a control unit for fixing the lasing wavelength of the laser beam that is output from the light-emitting device at a predetermined locked wavelength, based on the signal outputted from the wavelength monitor; and a correcting unit for outputting a correction signal toward the control unit based on the temperature sensed by the second temperature-sensing unit, the correction signal being operative to command the correction of any deviation in the locked wavelength associated with the temperature characteristic in the optical filter.

Another aspect of the present invention is that it further provides a WDM transmitting device including a plurality of the transmitting devices, the optical signals outputted from these transmitting devices being multiplexed and sent out.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 12A–C illustrate a filter holder according to an eighth embodiment of the present invention: FIG. 12A is a plan view of the filter holder; FIG. 12B is a front view of the same; and FIG. 12C is a plan view of a wiring connection.

DESCRIPTION OF THE INVENTION

Several embodiments of the present invention will now be described with reference to the drawings in comparison with the prior art.

Figure 1:
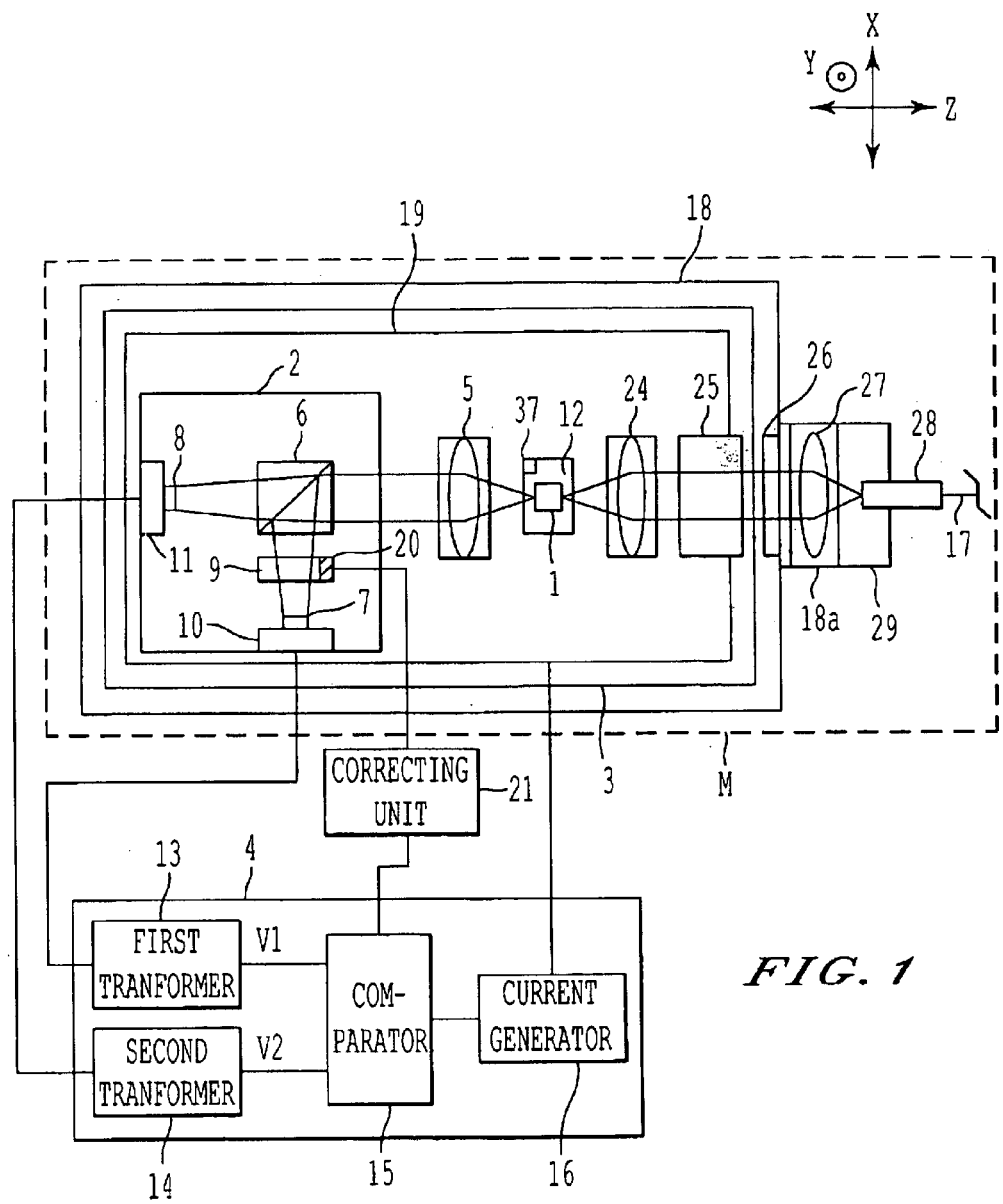
FIG. 1 is a block diagram of an optical transmitter constructed in accordance with a first embodiment of the present invention.
Figure 2:
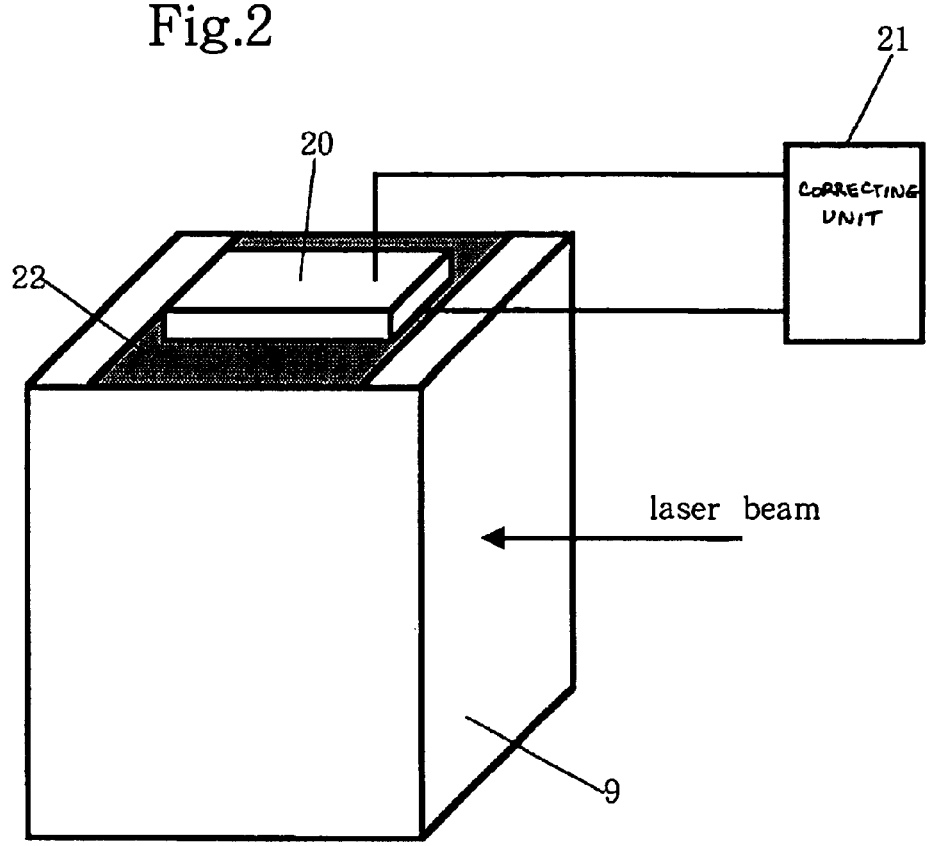
FIG. 2 is a perspective view of a temperature-sensing unit mounted on an optical filter.
Figure 3:
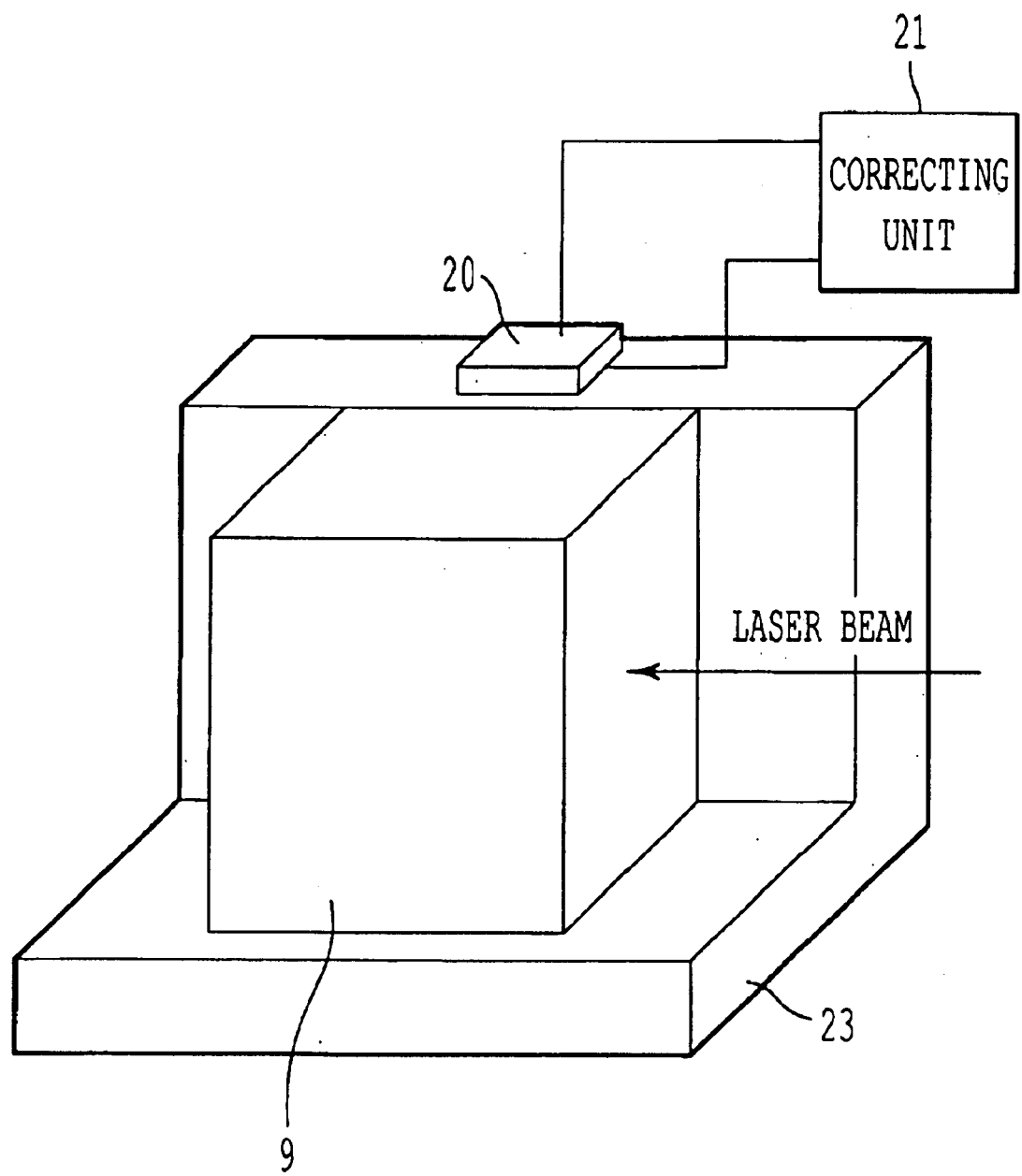
FIG. 3 is a perspective view of a filter holder supporting the optical filter with the temperature-sensing unit mounted thereon adjacent to the optical filter.

FIG. 1 illustrates a transmitter constructed in accordance with the first embodiment of the present invention. As shown in FIG. 1, the transmitter includes a light-emitting device 1 including a semiconductor laser diode or the like for outputting a laser beam, a wavelength monitor 2 for receiving a monitoring laser beam outputted from the back facet of the light-emitting device (left side as viewed in FIG. 1), a temperature regulator 3 including a Peltier device or the like for controlling the temperature in the light-emitting device 1, a control unit 4 for controlling the temperature in the temperature regulator 3 to fix the lasing wavelength of the laser beam outputted from the light-emitting device 1 at a predetermined locked wavelength, based on the output signal from the wavelength monitor 2, an optical fiber 17 for receiving and externally delivering the laser beam outputted from the front facet of the light-emitting device (right side as viewed in FIG. 1) and a hermetically sealed package 18.

A section enclosed by a dotted line in FIG. 1 defines an optical module M that includes the light-emitting device 1, the wavelength monitor 2, the temperature regulator 3 and the optical fiber 17.

The wavelength monitor 2 is disposed within the package 18 that hermetically seals the light-emitting device 1. The wavelength monitor 2 includes a half mirror 6 for dividing the laser beam output from the back face of the light-emitting device 1 and collimated by a collimating lens 5, a first photo detector 7 including a photo diode or the like for receiving one of the laser beam components divided by the half mirror 6, a second photo detector 8 including a photo diode or the like for receiving the other laser beam component from the half mirror 6 and an optical filter 9 disposed between the half mirror 6 and the first photo detector 7. The first and second photo detectors 7, 8 are fixedly mounted on first and second PD carriers 10, 11, respectively.

The optical filter 9 has a periodicity relating to its wavelength-transmissive light intensity characteristic. Such an optical filter may be formed of Fabry-Perot etalon, derivative multi-layer filter or the like which has the wavelength spacing equal to or smaller than 100 GHz for each cycle.

The light-emitting device 1 is fixedly mounted on an LD carrier 12. The LD carrier 12 also carries a first temperature-sensing unit 37 that includes a thermistor or the like for sensing the temperature in the semiconductor laser device 2.

The LD carrier 12 and wavelength monitor 2 are fixedly mounted on a base 19. Thus, the light-emitting device 1 is thermally coupled with the optical filter 9. As a result, the temperature in the optical filter 9 will vary depending on the change of temperature in the light-emitting device 1 due to the temperature regulator 3.

There is further provided a second temperature-sensing unit 20 including a thermistor or the like for sensing the temperature in the optical filter 9. The second temperature-sensing unit 20 is mounted directly on the optical filter 9 or disposed adjacent to the optical filter 9 for more accurately sensing the temperature in the optical filter 9.

The control unit 4 controls the temperature sensed by the first temperature-sensing unit 37 through the temperature regulator 3 to maintain the wavelength of the laser beam outputted from the semiconductor laser device 1, based on the differential voltage or voltage ratio between two inputted PD currents. The temperature regulator 3 works as a wavelength regulator.

The control unit 4 includes a first transformer 13 for transforming a first PD current outputted from the first photo detector 7 into a first voltage V1, a second transformer 14 for transforming a second PD current outputted from the second photo detector 7 into a second voltage V2, a comparator 15 for comparing the first voltage V1 from the first transformer 13 with the second voltage V2 from the second transformer 14 and for outputting the difference between the first and second voltages V1, V2 or voltage ratio as a control signal, and a current generator 16 for outputting a temperature control current for controlling the temperature in the temperature regulator 3 in response to the control signal from the comparator 15. The upstream side of the comparator 15 may include an amplifier (not shown) which is adapted to amplify the first and second voltages V1, V2 from the respective first and second transformers 13, 14.

The second temperature-sensing unit 20 is connected to a correcting unit 21 which outputs a correction signal to the control unit 4 based on the temperature sensed by the second temperature-sensing unit 20, the correction signal being a command for correcting any deviation in the locked wavelength associated with the temperature characteristic of the optical filter 9. More particularly, the correcting unit 21 applies a predetermined voltage corresponding on the temperature of the optical filter 9 to the comparator 15 in the control unit 4. Thus, the voltage of the control signal will be offset by the applied voltage to correct the deviation of wavelength due to the temperature characteristic of the optical filter 9.

Figure 4:
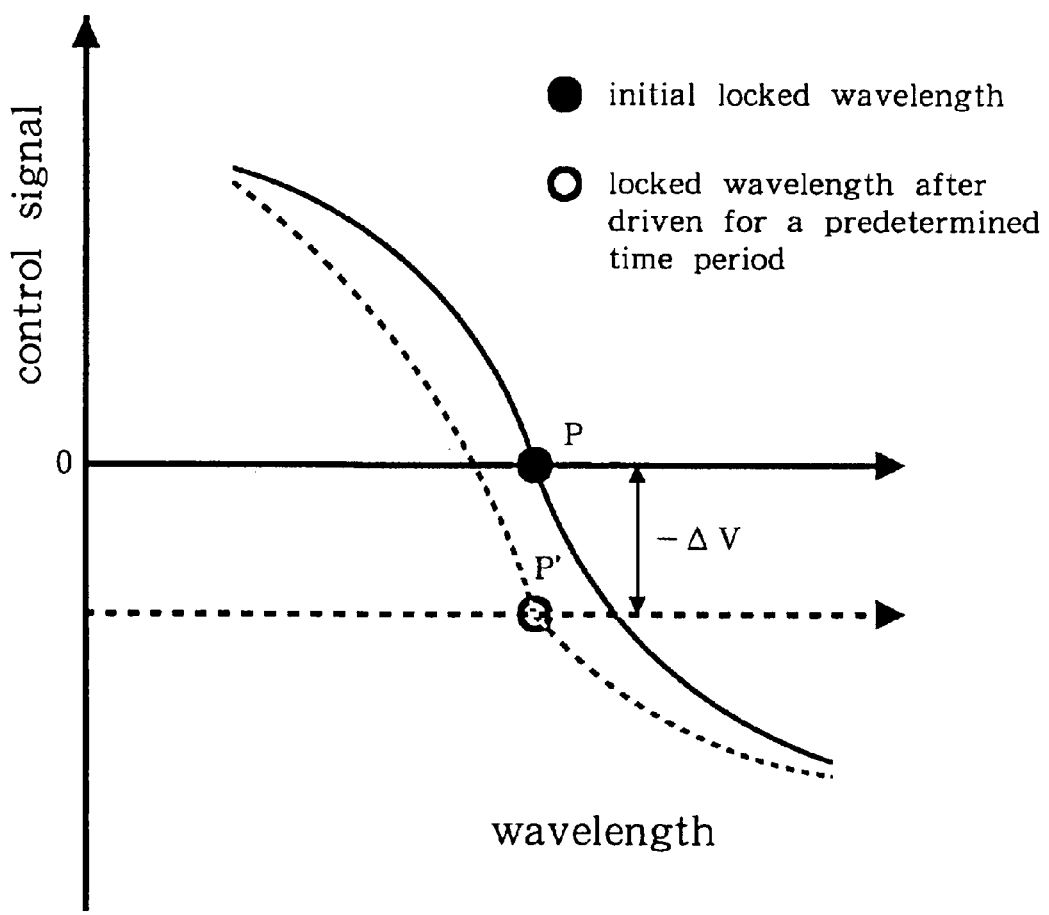
FIG. 4 is a graph illustrating a process of correcting any deviation in locked wavelength.

For example, the wavelength characteristic may be shifted toward shorter wavelengths due to the temperature characteristic of the optical filter 9 after a predetermined period time has passed from the initial state, as shown in FIG. 4. To maintain the initial locked wavelength, the temperature characteristic of the optical filter 9 is first pre-acquired. As the temperature of the optical filter 9 is sensed by the second temperature-sensing unit 20, the correction unit 21 outputs an appropriate correction voltage depending on the sensed change of temperature, this correction voltage being then fed back to the comparator 15 in the control unit 4. The correction voltage also offsets the control voltage signal at 0V point. Referring to FIG. 4, as the wavelength characteristic is deviated by the change of temperature in the optical filter 9 after the system has been driven from the initial state, 0V point for a predetermined period time, this change of temperature is sensed to output a voltage ΔV corresponding to the change of temperature. Thus, the 0V point is lowered by ΔV from the initial state. At this time the wavelength locking is carried out at the lowered 0V point. Therefore, the wavelength locking can more stably be performed without changing the wavelength in the initial state.

The voltage value to be offset may be read out from a database which has stored optimum offset voltage values determined by linearly calculating two pre-measured voltages for two temperatures or by selecting optimum voltages relating to the temperatures.

To sense the temperature in the optical filter 9 in a more accurate manner, the second temperature-sensing unit 20 may be bonded directly on the optical filter 9. In such a case, the optical filter 9 may include a wiring pattern previously formed on a metal film 22 on which the second temperature-sensing unit 20 is soldered onto the metal film 22. The second temperature-sensing unit 20 on the optical filter 9 is electrically connected to the correcting unit 21 through the external pins on the optical module M.

To sense the temperature in the optical filter 9 in a more accurate manner, the optical filter 9 is fixedly mounted on a filter holder 23 which is formed of any material having a better heat conductivity, including metals such as CuW and so on and ceramics such as AlN and so on. The second temperature-sensing unit 20 is mounted on the filter holder 23 at a position near the optical filter 9. The second temperature-sensing unit 20 is electrically connected with the correcting unit 21 through the external pins in the optical module M.

A collimating lens 24 for collimating the laser beam outputted from the front facet of the light-emitting device 1 is provided in front of the light-emitting device 1 (right side as viewed in FIG. 1). An optical isolator 25 for blocking the beam returned back to the light-emitting device 1 is provided in front of the collimating lens 24. The optical isolator 25 may be of a well-known structure, such as a combination of polarizer and Faraday rotator.

One side of the package 18 includes a flange 18a formed thereon. The flange 18a includes a window 26 for receiving the laser beam after passed through the optical isolator and a condensing lens 27 for condensing the laser beam.

The tip end of the optical fiber 17 is held by a metallic ferrule 28 which is fixedly mounted in a slide ring 29 fixed on the outer end of the flange 18a through YAG laser welding.

The laser beam from the front face of the light-emitting device 1 is collimated by the collimating lens 24 and then condensed into the optical fiber 17 through the optical isolator 25 and window 26, the laser beam being externally delivered through the optical fiber 17.

On the other hand, the laser beam from the back facet of the light-emitting device 1 is collimated by the collimating lens 5 and then divided by the half mirror 6 into two laser beam components, one being directed in the direction of Z-axis (transmission) and the other being directed in the direction of X-axis (reflection) perpendicular to the direction of Z-axis. The laser beam component directed in the direction of X-axis is received by the first photo detector 7 through the optical filter 9 while the other laser beam component directed in the direction of Z-axis is received by the second photo detector 8. First and second PD currents outputted from the first and second photo detectors 7, 8 are inputted into the control unit 4.

The control unit 4 includes a first transformer 13 for transforming the first PD current into a first voltage V1 and a second transformer 14 for transforming the second PD current into a second voltage V2. A comparator 15 compares the first voltage V1 with the second voltage V2 to create a control signal representing the difference or ratio between the first and second voltages V1, V2, the control signal being then outputted toward a current generator 16. As the current generator 16 receives the control signal, it selectively outputs a temperature control current used for raising or lowering the temperature in the temperature regulator 3. Thus, the lasing wavelength of the laser beam outputted from the light-emitting device 1 can be controlled to the desired wavelength.

The correcting unit 21 outputs a correction signal for commanding the correction of any deviation in the locked wavelength associated with the temperature characteristic of the optical filter 9 toward the control unit 4 in response to the temperature in the optical filter 9 which has been sensed by the second temperature-sensing unit 20. Thus, the lasing wavelength of the laser beam can be stabilized with increased accuracy. As a result, the degradation in the optical signal can be reduced to provide an optical module and transmitter having their improved reliability.

Figure 5:
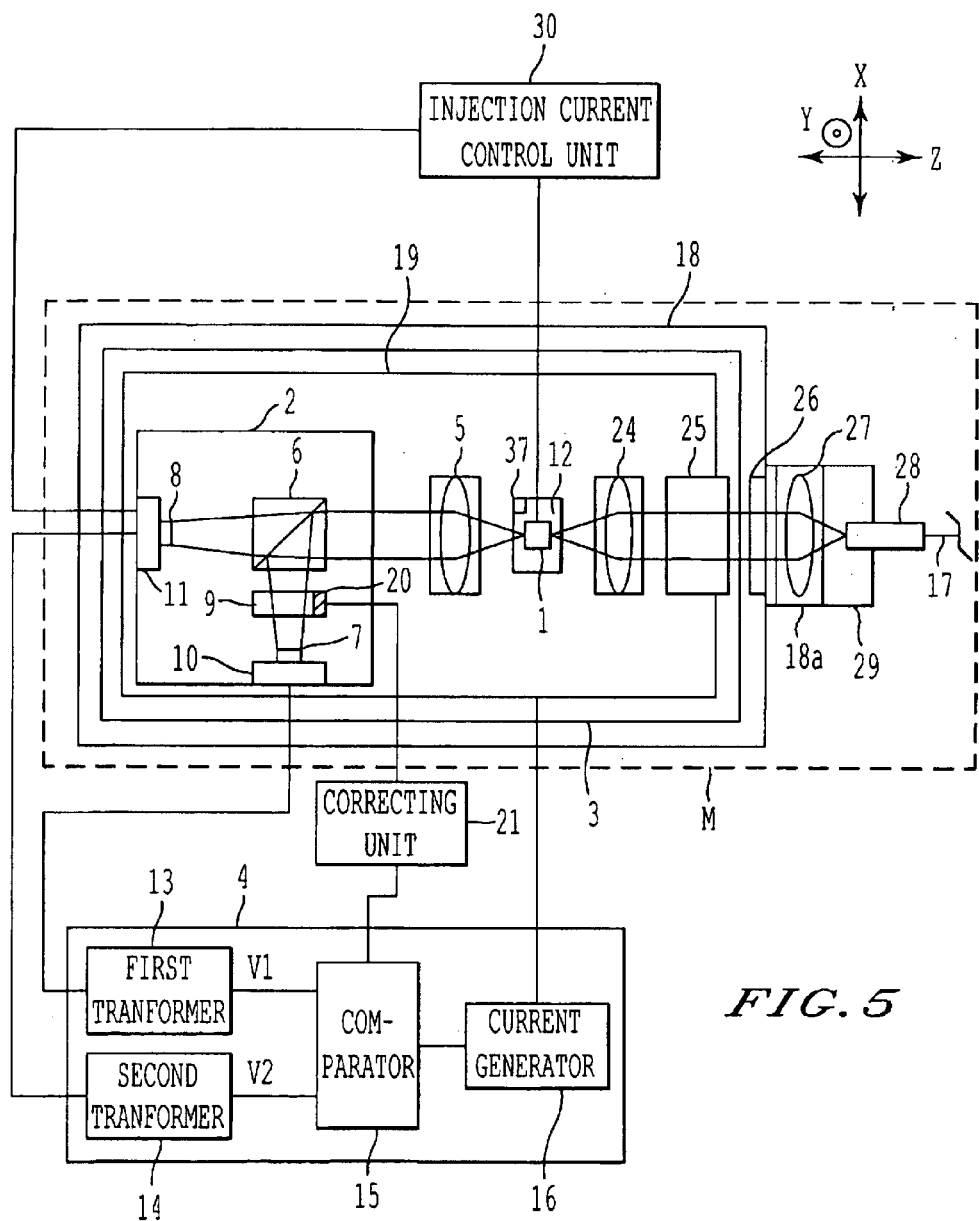
FIG. 5 is a plan view of a transmitter constructed in accordance with a second embodiment of the present invention.

FIG. 5 illustrates another transmitter constructed in accordance with the second embodiment of the present invention.

The second embodiment includes an injection current control unit 30 for controlling the injection current into the light-emitting device 1 based on the signal output from the photo detector 8 in the wavelength monitor 2. According to the second embodiment, the injection current control unit 30 can perform APC (Auto Power Control) by feeding-back the operation of the light-emitting device 1. In place of the photo detector 8 in the wavelength monitor 2, a dedicated power monitoring PD may be provided. Moreover, the control unit 4 may be combined with the injection current control unit 30 into an integral unit.

Figure 6:
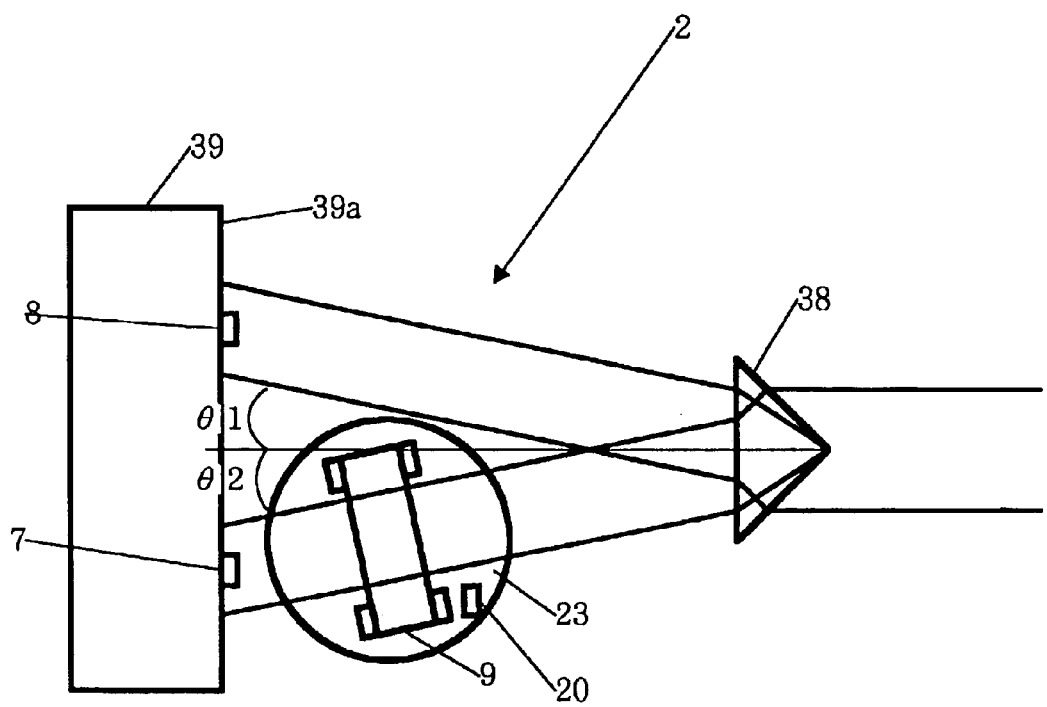
FIG. 6 is a plan view of a wavelength monitor constructed in accordance with a third embodiment of the present invention.

FIG. 6 is a plan view of a wavelength monitor according to the third embodiment of the present invention. As shown in FIG. 6, this wavelength monitor 2 includes a prism (or beam splitter) 38 for dividing the monitoring laser beam outputted from the back facet of the light-emitting device 1 into two laser beam components which are inclined relative to the optical axis with predetermined angles θ1 and θ2 all of which are less than 90 degrees, a first photo detector 7 for receiving one of the two divided laser beam components from the prism 38, a second photo detector 8 for receiving the other laser beam component from the prism 38, a optical filter 9 disposed between the first photo detector 7 and the prism 38 for permitting only a laser beam having a predetermined wavelength range to pass therethrough, and a PD carrier 39 on which the first and second photo detectors 7, 8 are mounted in the same plane (or the same mount plane 8a herein).

The entire surface of the prism 38 is coated with AR (Anti-reflection) film for suppressing the reflection of the laser beam. The inclined angles θ1 and θ2 of the laser beam components divided by the prism 38 are preferably in substantially the same range of angle (e.g., between 15 and 45 degrees). This is because the positions of the first and second photo detectors 7, 8 in which the laser beam is received can more easily be determined.

Since the first and second photo detectors 7, 8 for receiving the laser beam components divided by the prism 38 are mounted on the single PD carrier 39 in the same mount plane 323a, the third embodiment can reduce the number of parts as well as the manufacturing cost.

Since the two photo detectors 7 and 8 can be positioned merely by performing the optical alignment relative the single PD carrier 39, the number of manufacturing steps can be reduced with shortening of the manufacturing time.

Since the laser beam emitted from the light-emitting device 1 is optically coupled with the prism 38 through the collimating lens 5 and then divided by the prism 38 into two laser beam components which are in turn received by the two photo detectors on the single PD carrier 39, the optical path can be shortened to compact the necessary space. This reduces the size of the optical module. In addition, the monitoring laser beam can be conducted into the photo detectors 7 and 8 with improved condensing efficiency.

Since the incident beam is divided by the roof-type prism 38 and since the division at the prism 38 can be carried out even though the incident angle of the laser beam onto the prism 38 is reduced, the loss in the polarization dependency can be decreased.

Since the prism 38 is not a large optical part such a dividing coupler, the optical module with the wavelength monitor according to the present invention can be reduced in size. The roof-shaped prism 38 can regulate the angles of the divided laser beam components depending on the angle included between two bevels of the prism. Thus, the system can further be reduced in size.

Since the laser beam enters the prism 38 at two or more faces and are divided into the laser beam components which can pass through the prism 38, the wavelength dependency between the divided laser beam components can be reduced. Particularly, if the laser beam is divided into the laser beam components inclined relative to the optical axis with the same angle, the divided laser beam components will have the same wavelength dependency. Thus, this embodiment performing the comparison between the laser beam components can cancel the wavelength dependency in the divided laser beam.

Figure 7:
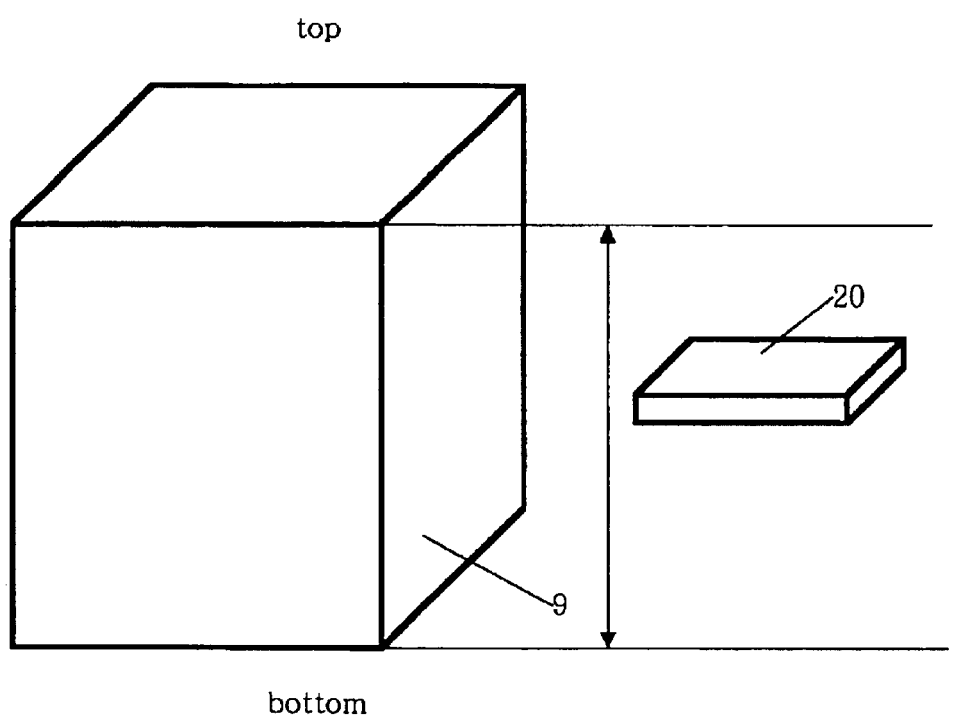
FIG. 7 is a perspective view illustrating a fourth embodiment of the present invention.

FIG. 7 is a perspective view illustrating the fourth embodiment of the present invention. To sense the temperature in the optical filter 9 more accurately, the temperature-sensing unit 20 located adjacent to the optical filter 9 is preferably disposed such that it will not more be influenced by either of the casing temperature or the temperature of the temperature regulator 3. As shown in FIG. 7, the temperature-sensing unit 20 in the fourth embodiment is disposed between the top and bottom of the optical filter 9 in the direction of height.

Figure 8:
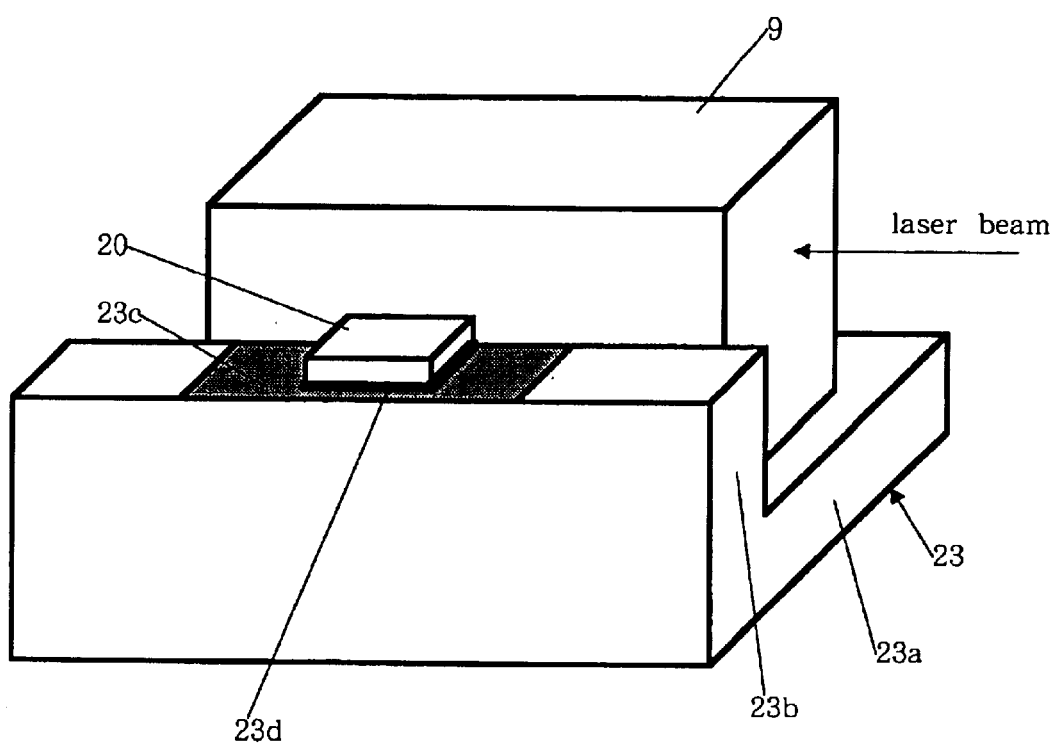
FIG. 8 is a perspective view illustrating a fifth embodiment of the present invention.

FIG. 8 is a perspective view illustrating the fifth embodiment of the present invention. In the fifth embodiment, the filter holder 23 is formed of a heat-conductive material into a substantially L-shaped cross section. The filter holder 23 has a first mount section 23a on which the optical filter 9 is to be mounted and a second mount section 23b integrally formed with the first mount section 23a and for positioning the temperature-sensing unit 20 at a middle position between the bottom and top of the optical filter 9.

A portion of the second mount section 23b on which the temperature-sensing unit 20 is to be mounted is plated with gold 23c to facilitate the fixation. The temperature-sensing unit 20 is fixed to the top gold-plated portion 23c of the second mount section 23b through a soldering material 23d.

Figure 9:
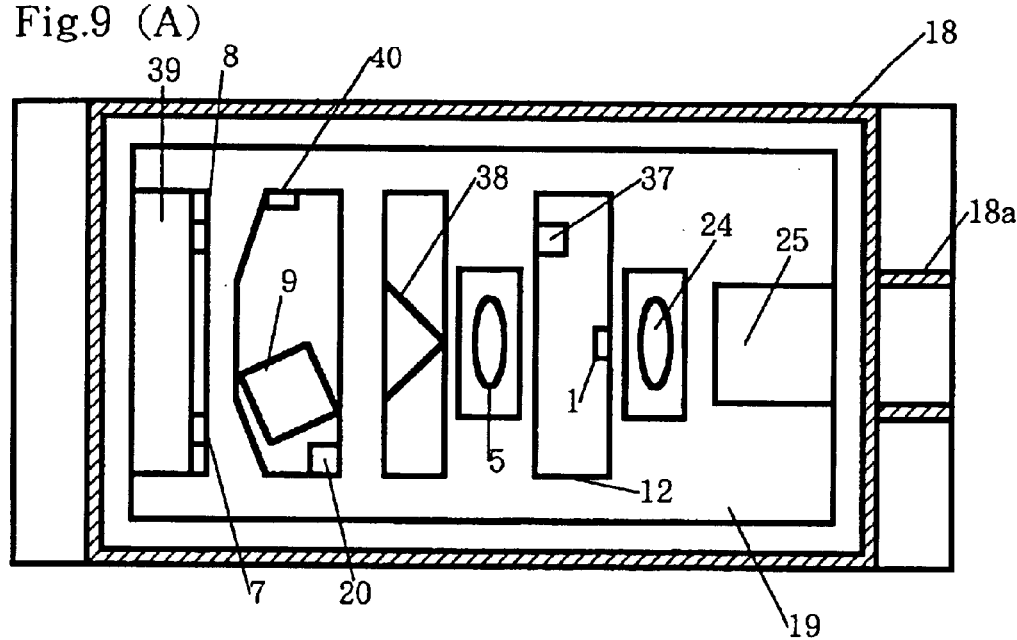
FIGS. 9A and B are plan and side views illustrating a sixth embodiment of the present invention.
Figure 9:
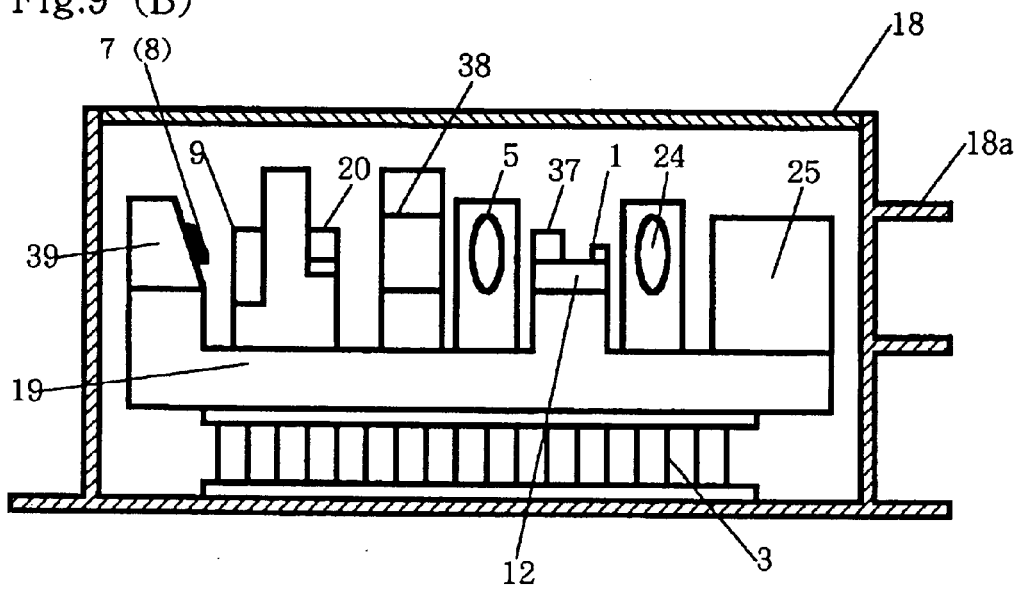

FIGS. 9A and 9B are plan and side views illustrating the sixth embodiment of the present invention. The thermal radiation to the optical filter 9 occurs not only from the top of the package 18, but also from the sides thereof. As shown in FIG. 9A, thus, the temperature-sensing unit 20 is preferably disposed adjacent to the optical filter 9 between the optical filter 9 and the corresponding inner side wall of the package 18. This enables the thermal radiation to be sensed more accurately.

To drive the wavelength locking, the lasing wavelength of the light-emitting device 1 must be within a predetermined range in the wavelength discrimination curve.

Figure 10:
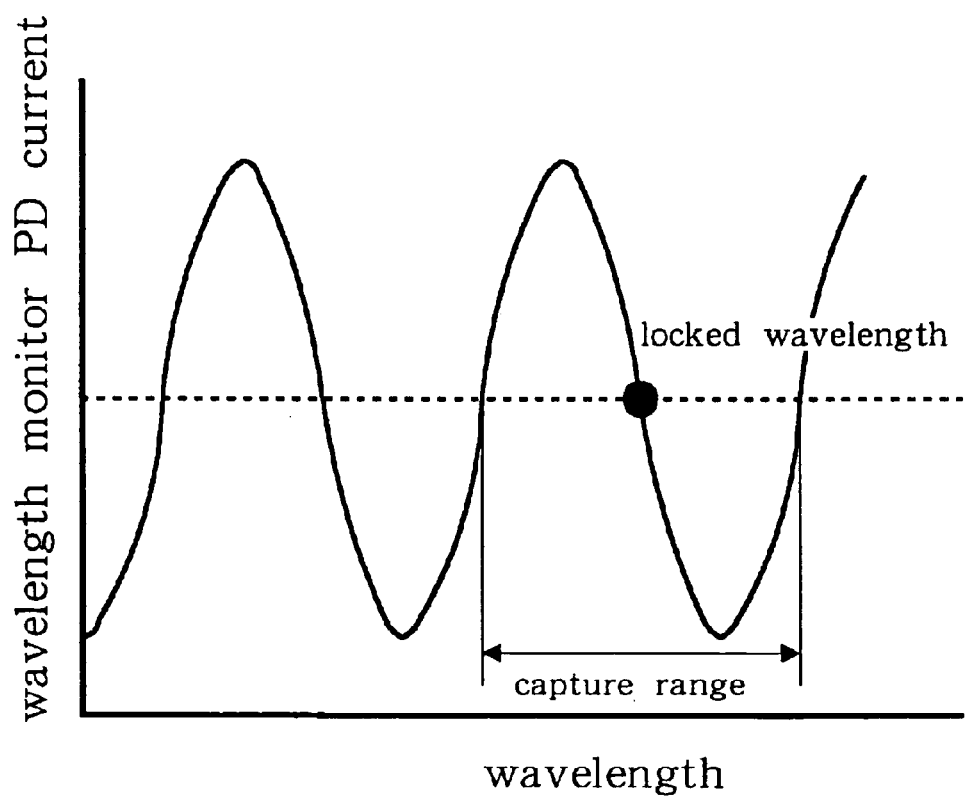
FIG. 10 is a graph showing a wavelength discrimination curve.

FIG. 10 is a graph illustrating a wavelength discrimination curve. In this figure, a black spot on the wavelength discrimination curve represents a wavelength to be locked. To drive this wavelength locking, the spot must previously be located with such a capture range as shown. To carry out this, ATC drive for sensing the temperature in the light-emitting device 1 to control the temperature regulator 3 including the Peltier module is required. In addition, a first temperature-sensing unit 37 for detecting the temperature in the light-emitting device 1 as used in the prior art is required. Therefore, the optical module according to this embodiment includes the temperature-sensing unit 37 for the light-emitting device 1 and the temperature-sensing unit 20 for the optical filter 9.

A procedure of controlling the wavelength locking will now be described. First of all, a current is injected into the light-emitting device through ACC or APC circuit. The temperature in the light-emitting device 1 is sensed by the first temperature-sensing unit 37, the sensed value being then inputted into ATC circuit to control the temperature in the temperature regulator 3. The ATC circuit compares the sensed temperature with a reference temperature and controls the temperature regulator 3 such that the difference between the sensed temperature and the reference temperature will be zero. Thus, the lasing wavelength can be controlled by controlling the reference temperature. When the reference temperature is controlled, the lasing wavelength is regulated into within such a capture range as shown in FIG. 10. After this has been confirmed, it is switched to the wavelength locking. Based on the wavelength monitor signal, the temperature regulator 3 is controlled in temperature.

This procedure of controlling the wavelength locking stabilizes the lasing wavelength into the plotted locking point.

Figure 11:
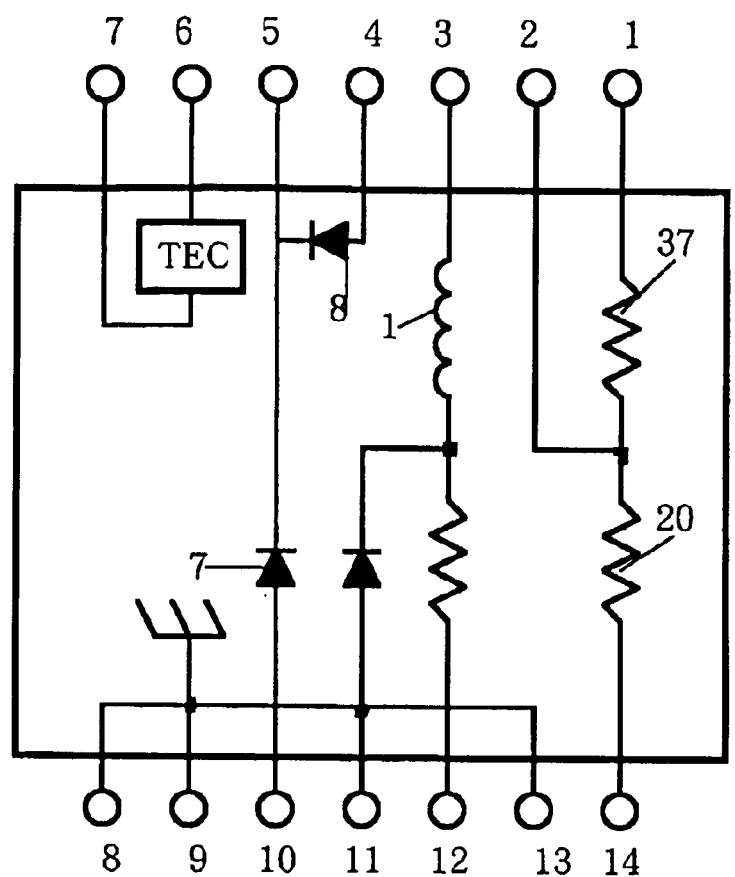
FIG. 11 is a wiring diagram illustrating a seventh embodiment of the present invention.

FIG. 11 is a wiring diagram illustrating the seventh embodiment of the present invention. If the wavelength monitor is included in a standard 14-pin butterfly module, a photo detector for the wavelength monitor must be wired. The temperature-sensing unit 20 in the optical filter 9, for example, a thermistor can sense the temperature through its resistance. To provide a wiring with less wires in an effective manner, temperature-sensing unit 20 may have a common terminal shared by the temperature-sensing unit 37 or thermistor in the light-emitting device 1 to reduce the number of wires. As shown in FIG. 11, for example, first and second pins may be used as terminals for the first temperature-sensing unit 37 in the light-emitting device while fourteenth pin may be used, with the second pin, for the second temperature-sensing unit 20 in the optical filter 9. Thus, the number of pins can be reduced. If the cathode in the wavelength monitor photo detector 7 is connected with that of the power monitor photo detector 8 as shown in FIG. 11, the two photo detector 7 and 8 can be connected with each other through three terminals, that is, fourth, fifth and tenth pins.

FIGS. 12A and B are plan and front views of a filter holder according to the eighth embodiment of the present invention while FIG. 12C is a plan view illustrating a wire connection.

The filter holder 23 is formed of a better heat-conductive material for reducing the thermal resistance between the filter holder and the temperature regulator 3. Such a material may include CuW. To provide a predetermined wavelength discrimination, it is required to align and fix the etalon. In such a case, it is also important that the weldability is improved. Thus, any other alloy or SUS material may preferably be used.

Figure 13:
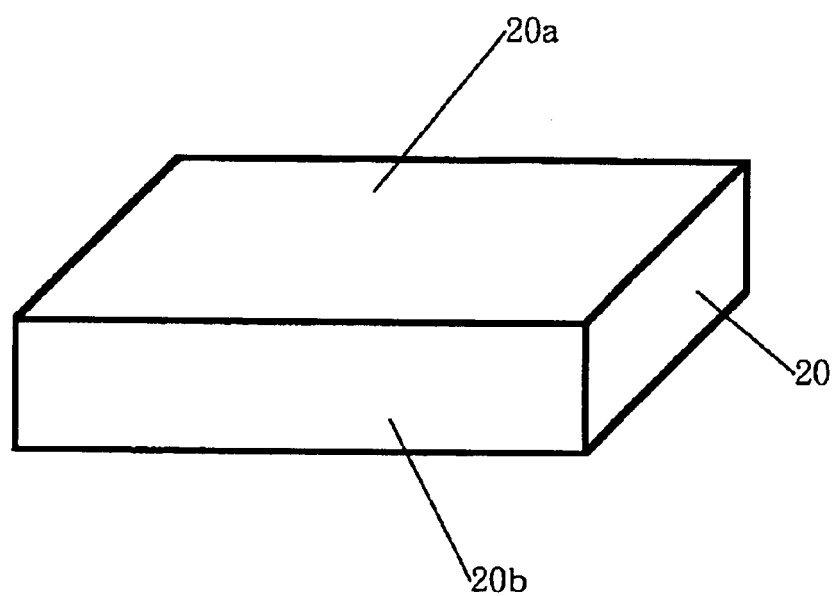
FIG. 13 is a perspective view of a temperature-sensing unit.

The filter holder 23 also includes a second mount section 23b on which the temperature-sensing unit 20 is to be mounted. As shown in FIG. 13, the temperature-sensing unit 20 may include top and bottom electrodes 20a, 20b, as shown in FIG. 13. The second mount section 23b of the filter holder 23 is previously plated with gold 23c. The temperature regulator 20 is fixedly mounted on the second gold-plated mount section 23b through a soldering material 23d (see FIG. 8).

The height of the second mount section 23b is determined such that the temperature-sensing unit 20 is positioned between the bottom and top of the filter 9 in its direction of height.

To perform the electrical wiring within the module in an effective manner, the filter holder 23 may be formed of metal to function as a wiring member for feeding a current to the filter holder. The top of the temperature-sensing unit 20 is connected with the connection terminal of the package 18 through a wire W.

On the other hand, it is required that the terminal having the same potential on the top of the temperature-sensing unit 20 is connected with the common terminal on the package 18. As shown in FIG. 12, thus, a common terminal strut 40 is provided on the filter holder 23. The top face of the strut 40 is plated with gold to facilitate the wire bonding. Thus, the top face of the strut 40 can be connected with the common connection terminal in the package 18 through a wire W (see FIG. 12C).

Figure 14:
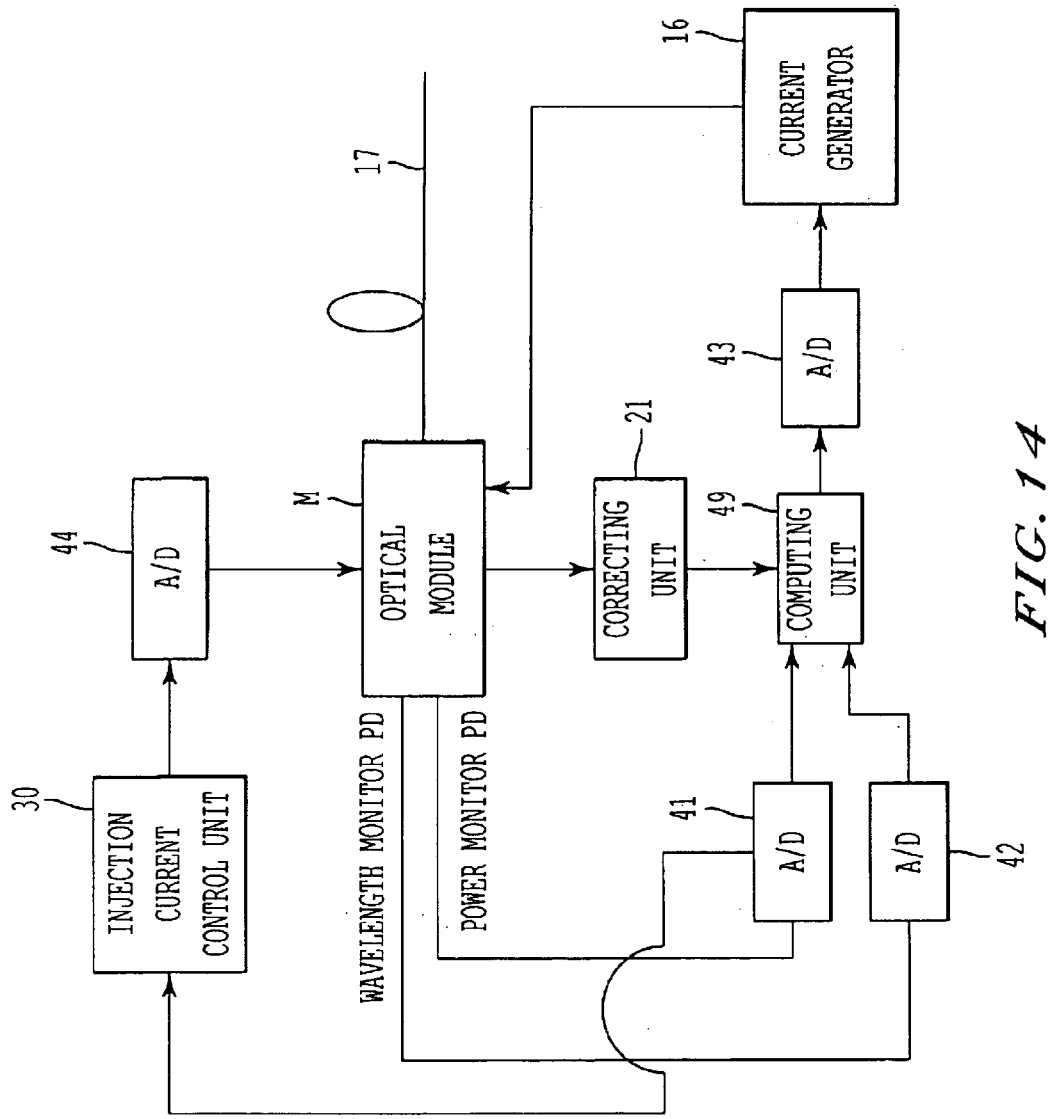
FIG. 14 is a block diagram of a ninth embodiment of the present invention.

FIG. 14 is a block diagram illustrating the ninth embodiment of the present invention. As shown in FIG. 14, the ninth embodiment is characterized by that it uses analog/digital converters 41, 32 and 44 in the control system.

In such a control technique shown in FIG. 14, signals originated from the power and wavelength monitor PD currents are subjected to analog/digital conversion. The PD current signals are inputted into a computing unit 49 which in turn computes the difference or ratio therebetween and outputs a control signal.

If the PD current signal ratio is used to perform the control, the temperature compensation in the optical filter 9 can be carried out in the following manner. When the optical fiber output of the optical module is constant and the lasing wavelength is constant and if the casing temperature is different, the wavelength and power monitor PD currents are measured. At this time, the thermistor temperature in the second temperature-sensing unit 20 for sensing the temperature in the optical filter 9 is measured. The experimental results are shown in Table 1.

[Table 1]

Figure 15:
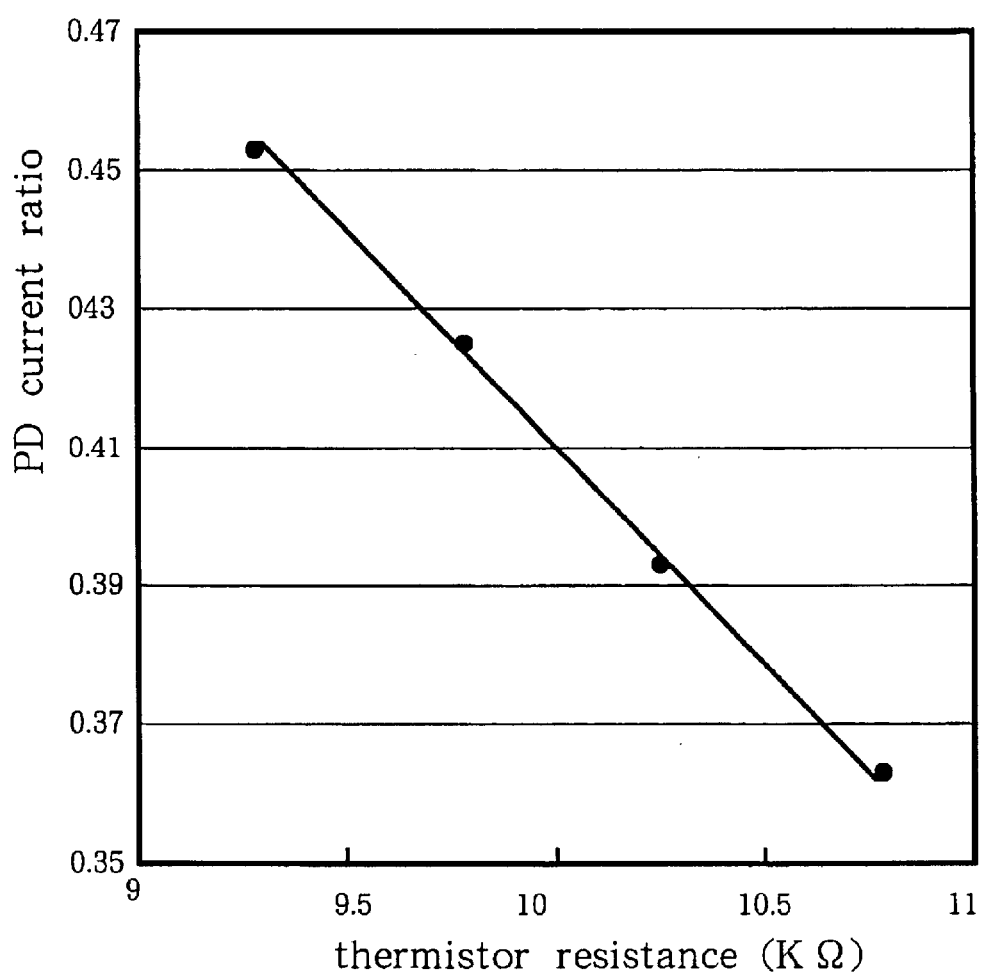
FIG. 15 is a graph showing the relationship between the thermistor resistance (R) of an optical filter (etalon) and PD current ratio (P).

FIG. 15 is a graph illustrating the relationship between the thermistor resistance (R) of the optical filter (etalon) and the PD current ratio (P) from the aforementioned experimental results. As will be apparent from FIG. 15, there is provided the relationship represented by (P)=A X (R)+B where A and B are constants.

Figure 16:
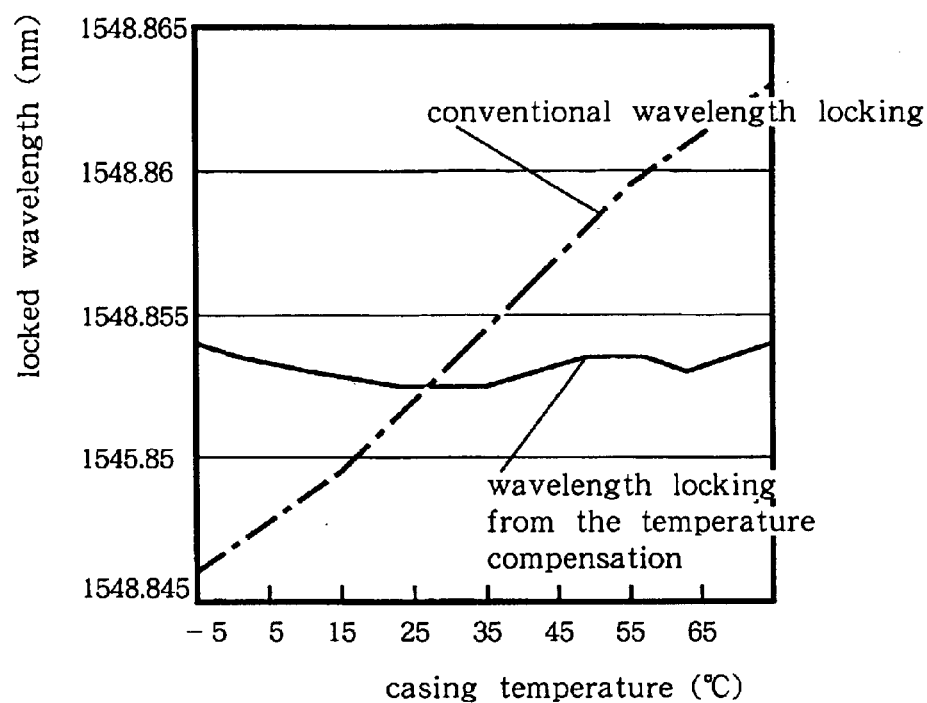
FIG. 16 is a graph illustrating the relationship between the temperature at a casing and the locked wavelength in comparison between the ordinary locked wavelength and the locked wavelength of this embodiment due to temperature compensation.

The PD current ratio can be represented as a function of thermistor resistance in the optical filter. Thus, the PD current ratio for locking the wavelength relative to the temperature in the optical filter 9 can dynamically be varied. In practice, the characteristic obtained when the PD current ratio becomes constant in the range of 5–70 C in casing temperature by performing the control using such a wavelength locking mechanism was compared with the results obtained when the temperature compensation was carried out by using the first temperature-sensing unit 20 (thermistor) in the optical filter 9. FIG. 16 is a graph comparing the conventional wavelength locking with the wavelength locking from the temperature compensation according to this embodiment in the relationship of the locked wavelength relating to the casing temperature.

As will be apparent from FIG. 16, the amount of wavelength drift was reduced to about 1/10 by carrying out the wavelength locking associated with the temperature compensation of this embodiment. This can highly improve the wavelength stability.

Figure 17:
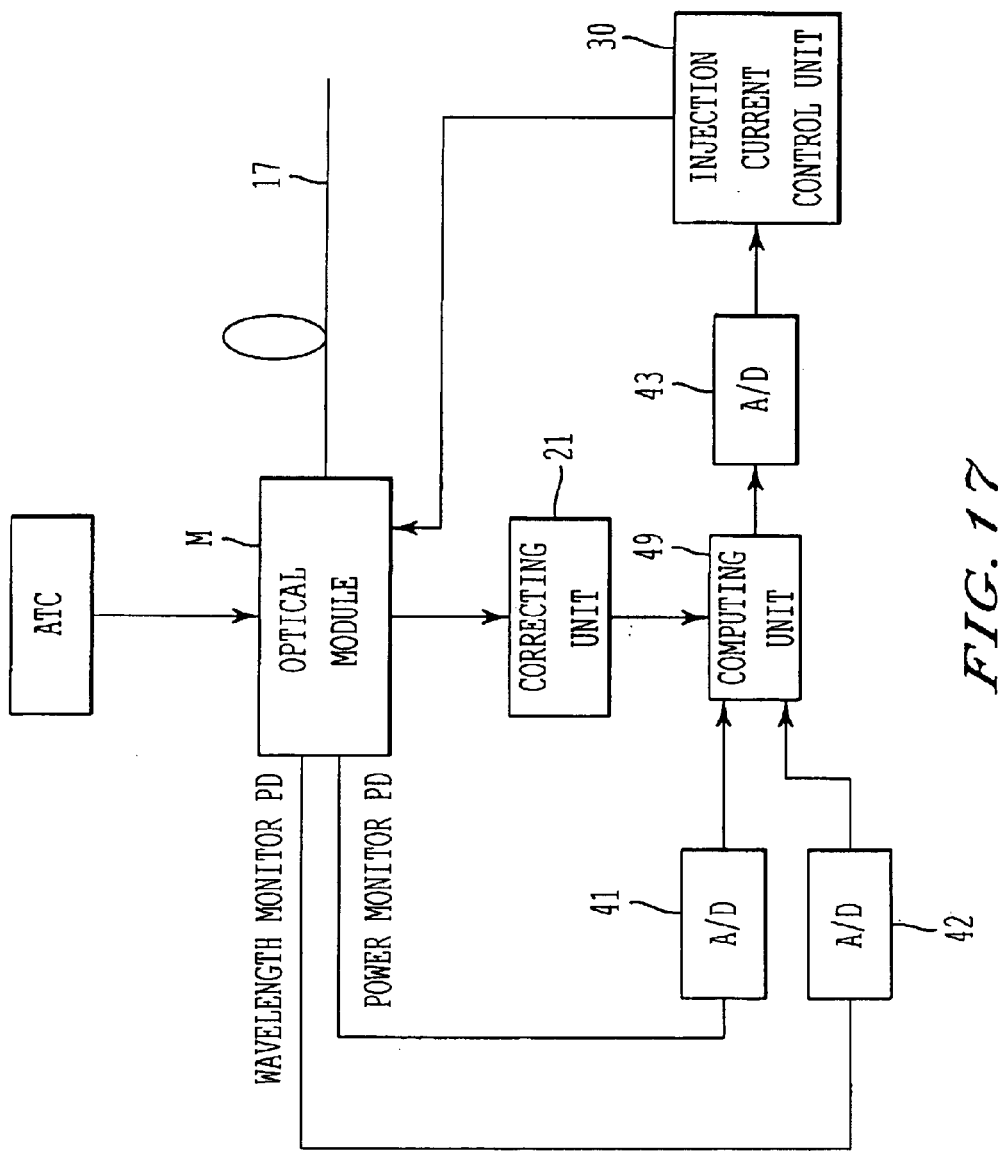
FIG. 17 is a block diagram illustrating a tenth embodiment of the present invention.

FIG. 17 is a block diagram illustrating the tenth embodiment of the present invention. The tenth embodiment feed the signal from the wavelength monitor 2 back to the injection current.

Figure 18:
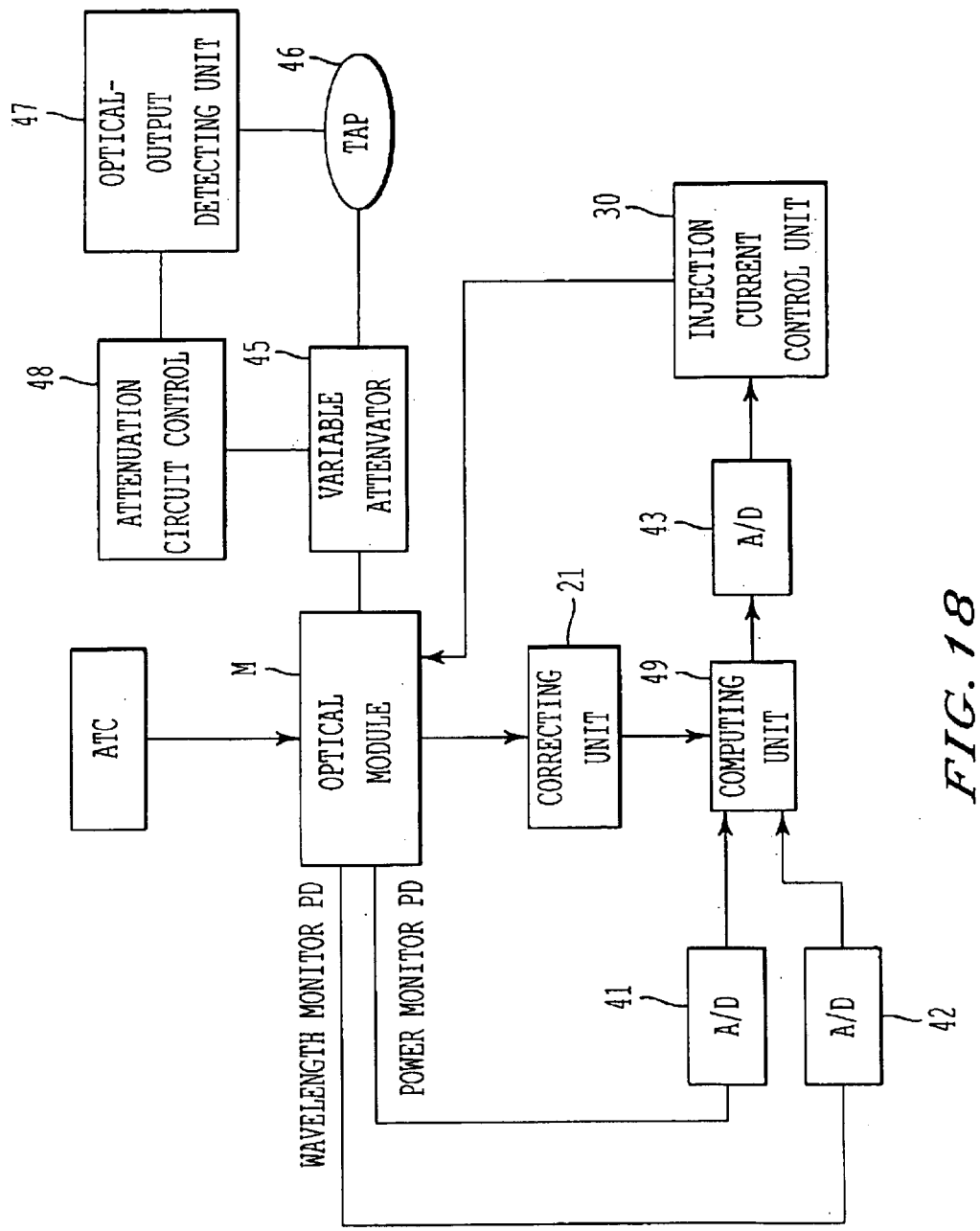
FIG. 18 is a block diagram illustrating a modified form from that of FIG. 17.

In this case, the optical output from the optical module will be variable, rather than becoming constant. As shown in FIG. 18, thus, the optical module is connected with a variable attenuator 45. A portion of the laser beam passed through the variable attenuator 45 is cut off by a tap 46. The optical output of this optical signal is monitored by an optical-output detecting unit 47. Based on the monitor signal from the optical-output detecting unit 47, an attenuation control circuit 48 outputs a control signal toward the variable attenuator 45 to control the attenuation in the variable attenuator 45 such that the optical output will be constant.

Figure 19:
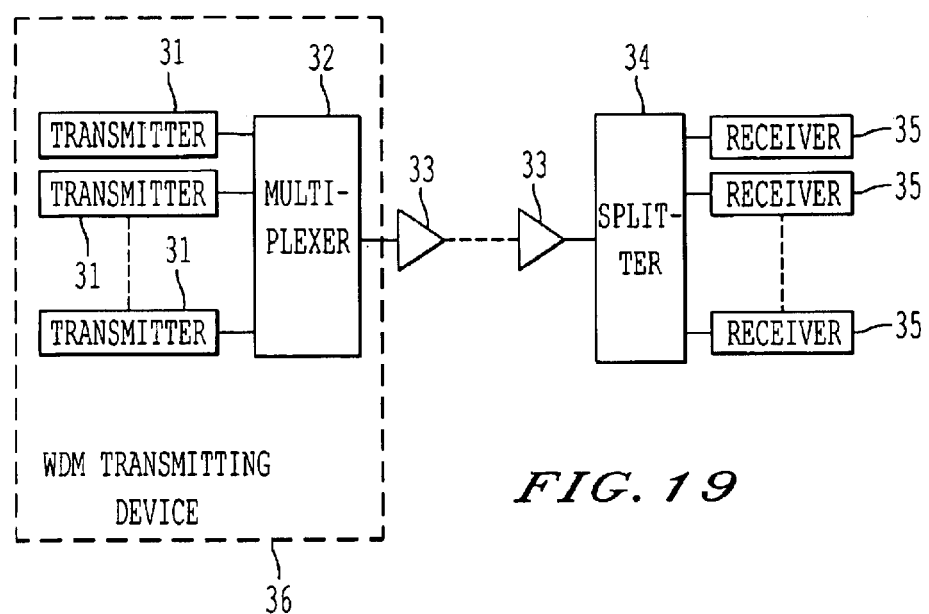
FIG. 19 illustrating a WDM transmitting device used in a wavelength division multiplexing communication system according to an eleventh embodiment of the present invention.
Figure 20:
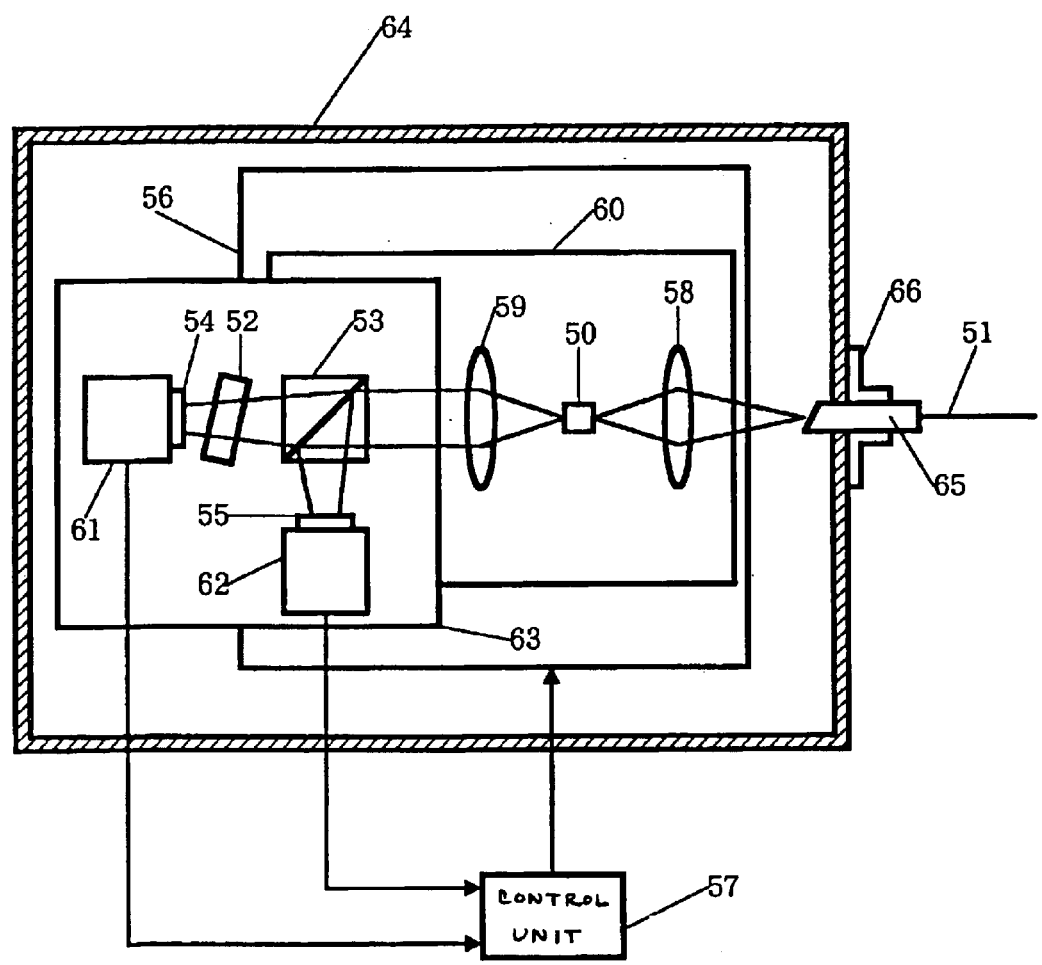
FIG. 20 is a schematic illustration of an optical module according to the prior art.
Figure 21:
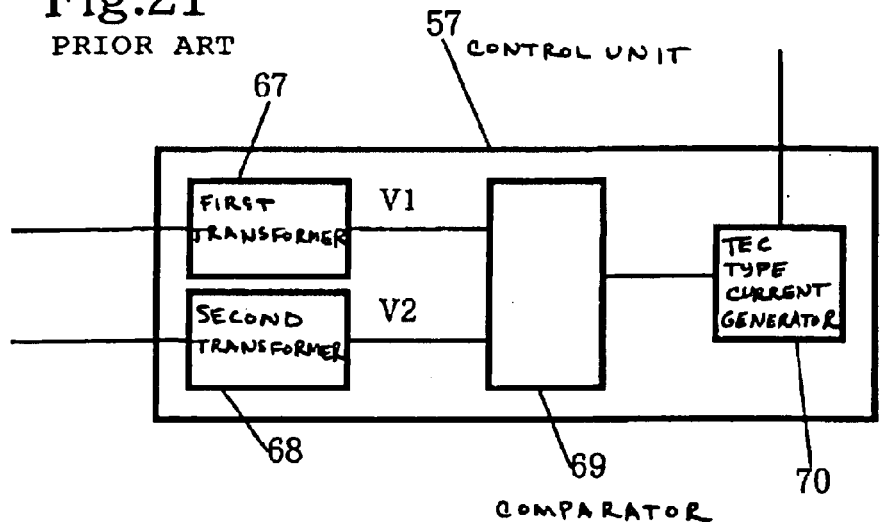
FIG. 21 is block diagram of a control unit.
Figure 22:
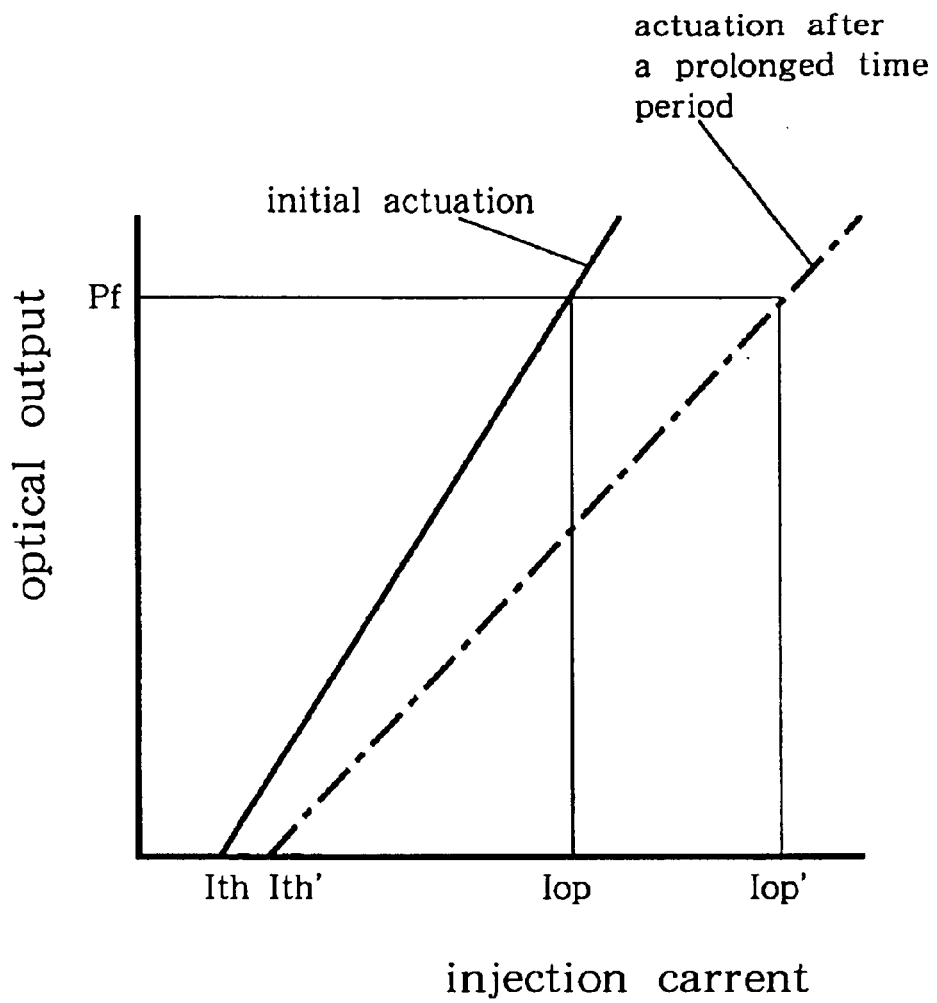
FIG. 22 is a graph illustrating the age degradation of a laser diode.
Figure 23:
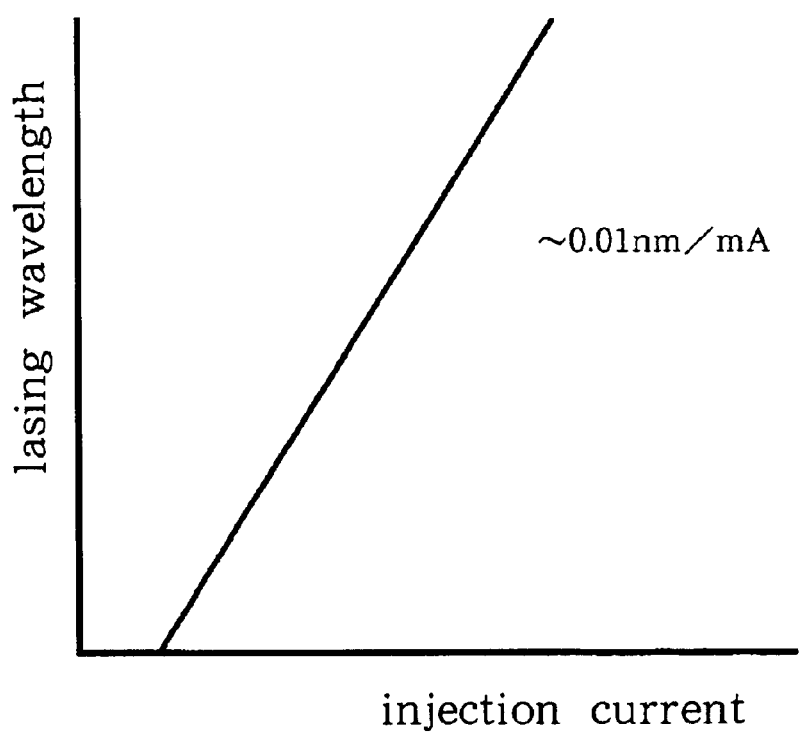
FIG. 23 is a graph illustrating the relationship between the injection current and the lasing wavelength when the temperature in the laser diode at its LD carrier is constant.
Figure 24:
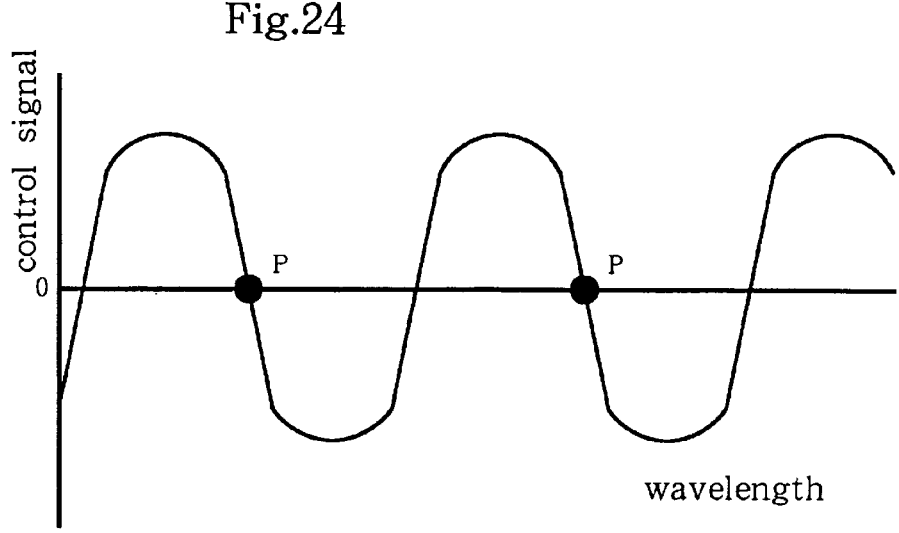
FIG. 24 is a graph illustrating the relationship between the wavelength characteristics and the locked wavelength in an optical filter.
Figure 25:
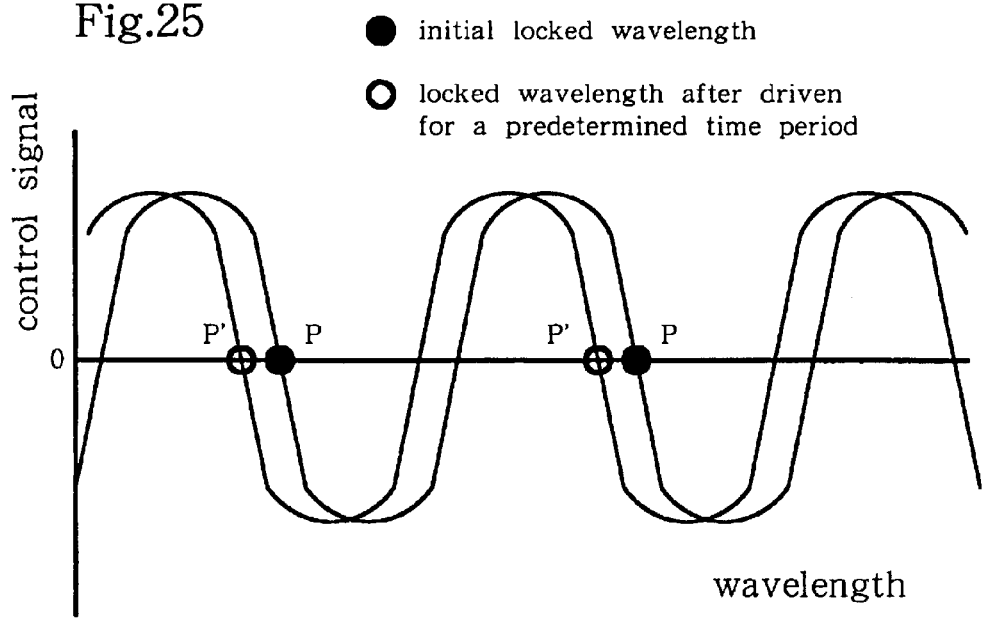
FIG. 25 is a graph illustrating the deviation in locked wavelength due to the change of temperature in the optical filter.
Figure 26:
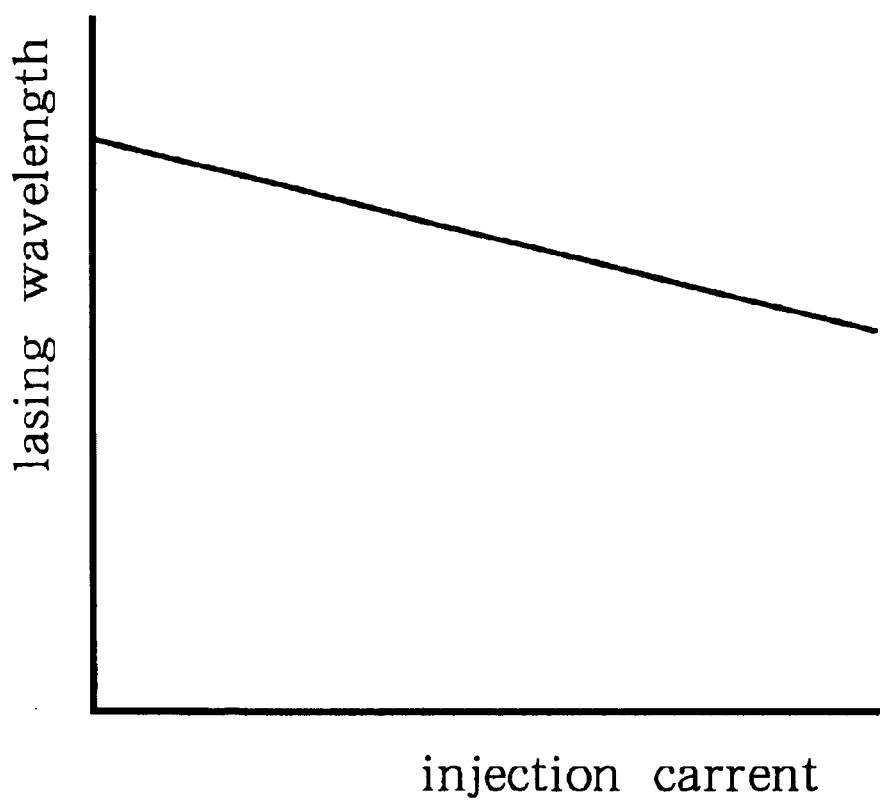
FIG. 26 is a graph illustrating the relationship between the injection current and the locked wavelength when the wavelength monitor is driven.
Figure 27:
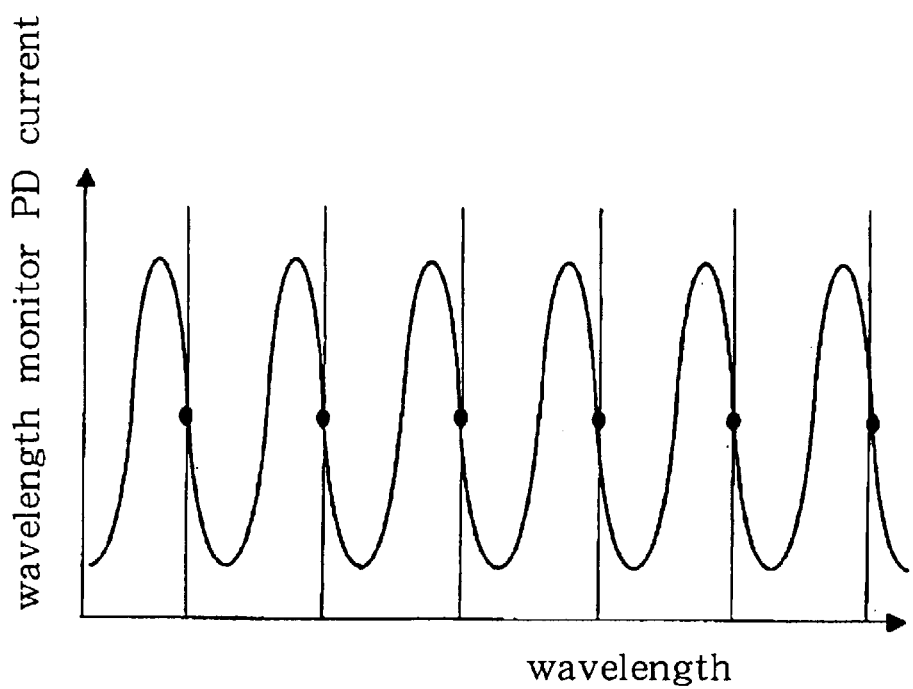
FIG. 27 is a graph illustrating the wavelength discrimination characteristics of an optical filter (etalon filter).
Figure 28:
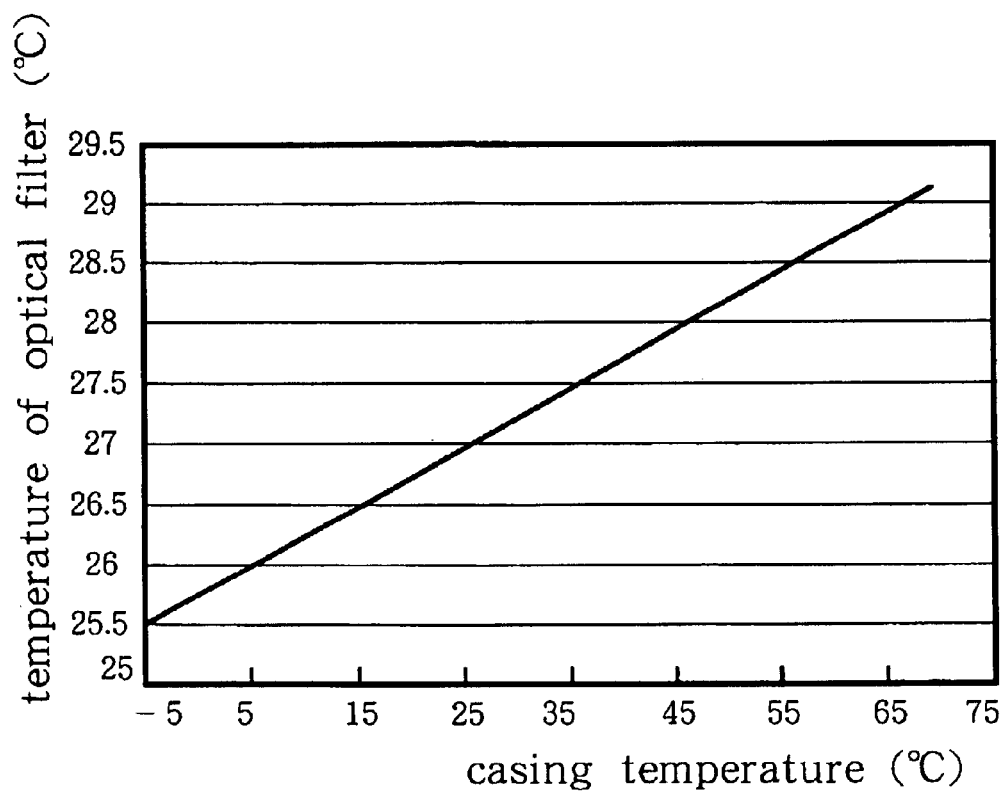
FIG. 28 is a graph illustrating the relationship between the temperature at the casing and the temperature at the filter.
Figure 29:
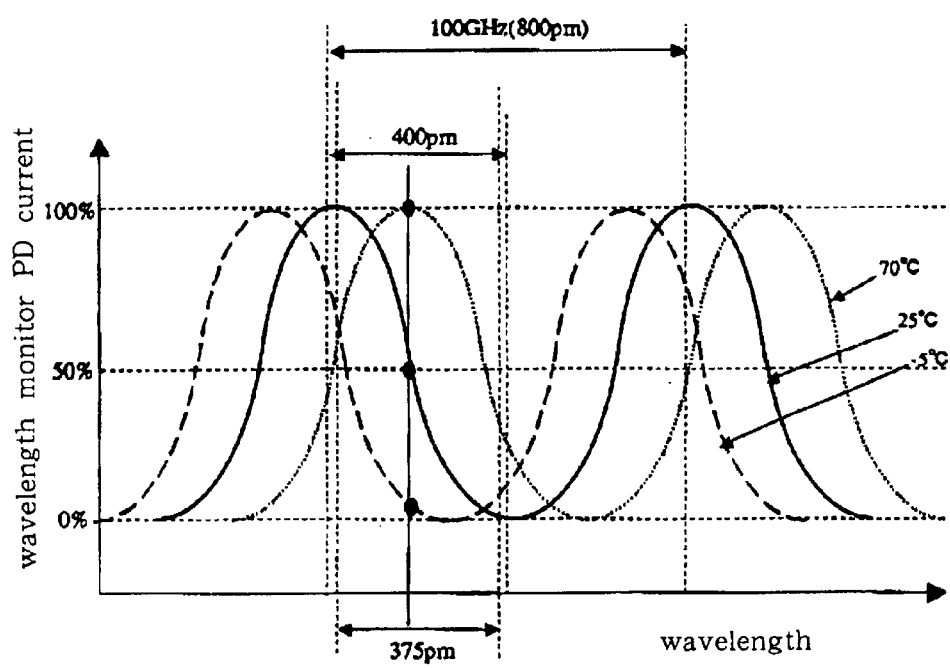
FIG. 29 is a graph illustrating the relationship between the wavelength and the PD current of the wavelength monitor for explaining the problems in the prior art.

FIG. 19 illustrates a WDM transmitting device used in the wavelength division multiplexing communication system according to the eleventh embodiment of the present invention.

As shown in FIG. 19, the wavelength division multiplexing communication system includes a plurality of transmitters 31 for transmitting optical signals, a multiplexer 32 for multiplexing a plurality of optical channel signals transmitted from the transmitters 31, a plurality of optical amplifiers 33 for amplifying and relaying the optical signals multiplexed by the multiplexer 32, a splitter 34 for separating the optical signals amplified by the optical amplifiers 33 for each channel, and a plurality of receivers 35 for receiving the separated optical signals from the splitter 34.

The WDM transmitting device 36 according to the eleventh embodiment of the present invention includes a plurality of such transmitters 31 as described in connection with the first and second embodiments. Optical signals outputted from these transmitters 31 are multiplexed and sent out. Thus, the wavelength in each of the optical signals emitted from the receivers 31 will be stable. This can provide a dense WDM system having its improved reliability.

The present invention is not limited to the aforementioned embodiments, but may be modified or changed into various other forms without departing from the spirit and scope of the appended claims. For example, the light-emitting device 1 may be fixedly mounted on a base different from that of the optical filter 9. These bases may thermally be coupled with each other through any intermediate member.

The controller aspects of this invention may be conveniently implemented using a conventional general purpose digital computer, digital signal processor or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to semiconductor memory including ROMs, RAMs, EPROMs, EEPROMs, magnetic memory including floppy disks or hard disks, and optical media such as optical disks, all of which are suitable for storing electronic instructions.

Obviously, additional numerous modifications and variations of the present invention are possible in light of the above teachings. It is therefore to be understood that within the scope of the appended claims, the present invention may be practiced otherwise than as specifically described herein.

What is claimed is:

1. An optical module comprising:
    a light-emitting device configured to output a laser beam;
    a first temperature-sensing unit disposed adjacent to the light-emitting device so as to sense a temperature of said light-emitting device;
    an optical filter positioned to receive and filter at least a component of the laser beam;
    a wavelength monitor device configured to monitor a wavelength of the laser beam and output a signal associated with monitored light at the wavelength;
    a wavelength regulating unit configured to regulate the wavelength of the laser beam that is output from said light-emitting device based on said signal from the wavelength monitor device; wherein at least a portion of said wavelength monitor device being in contact with said wavelength regulating unit; and
    a second temperature-sensing unit disposed adjacent to said optical filter so as to sense a temperature of said optical filter, the signal of the temperature sensed by said second temperature-sensing unit being used to correct the signal outputted from said wavelength monitor device.

2. The optical module as defined in claim 1, wherein: said wavelength regulating unit is adapted to regulate the wavelength of said light-emitting device by regulating the temperature in said light-emitting device.

3. The optical module as defined in claim 1, wherein:
    said second temperature-sensing unit being in contact with said optical filter.

4. The optical module as defined in claim 1 wherein:
    said wavelength regulating unit is configured to regulate the wavelength of said laser beam by regulating the temperature of said light-emitting device.

5. The optical module as defined in claim 4, wherein:
    said wavelength monitor device comprises
        a beam splitter configured to divide said laser beam into two laser beam components, and
        two photo detectors each positioned to receive respective of the two laser beam components and photo electrically transform each component into respective electric signals which form said signal that is output from said wavelength monitor device, wherein
        said optical filter is disposed between at least one of said two photo detectors and the beam splitter.

6. The optical module as defined in claim 5, wherein:
    said beam splitter is a prism.

7. The optical module as defined in claim 5, wherein:
    said prism includes two faces oriented at respective predetermined angles with respect on an optical axis of the prism.

8. The optical module as defined in claim 1 wherein:
    said wavelength monitor device comprises
        a beam splitter configured to divide said laser beam into two laser beam components, and
        two photo detectors each positioned to receive respective of the two laser beam components and each configured to photo electrically transform each component into respective electric signals which form said signal that is output from said wavelength monitor device, wherein
        said optical filter is disposed between at least one of said two photo detectors and the beam splitter.

9. The optical module as defined in claim 1, wherein:
    said optical filter is a Fabry-Perot etalon filter that exhibits a cyclic wavelength-transmission characteristic with a wavelength spacing for each cycle being equal to or smaller than a spacing that corresponds to a frequency of 100 GHz.

10. The optical module as defined in claim 1, wherein:
    said wavelength regulating unit is adapted to lock the wavelength of the laser beam at a predetermined wavelength based on the signal from said wavelength monitor device after the wavelength monitor device regulates the wavelength of the laser beam to fall within a wavelength range based on a first temperature signal that is produced from said first temperature-sensing unit, and the second temperature-sensing unit is configured to produce a second temperature signal that is used by said wavelength regulating unit to correct any deviation in the locked wavelength associated with a temperature characteristic of said optical filter.

11. The optical module as defined in claim 10, wherein:
both the first temperature-sensing unit and the second temperature-sensing unit are configured to share a common terminal.

12. The optical module as defined in claim 11, further comprising:
a butterfly package having 14 pins, said common terminal being connected to one of said 14 pins.

13. The optical module as defined in claim 1, wherein:
a surface of said optical filter has a metallic electric wiring pattern; and
said second temperature-sensing unit is mounted on said metallic pattern.

14. The optical module as defined in claim 1, wherein:
said wavelength monitor device includes a filter holder formed of a heat conductive material;
said optical filter is fixedly mounted to said filter holder; and
said second temperature-sensing unit is mounted adjacent to said optical filter on said filter holder.

15. The optical module as defined in claim 14, wherein:
said filter holder includes
a first mount section on which said optical filter is mounted, and
a second mount section integrally formed with said first mount section and adapted to position said second temperature-sensing unit at an intermediate position between a bottom face and a top face of said optical filter.

16. The optical module as defined in claim 15, wherein:
the second mount section of said filter holder has a gold plated layer on which the second mount section is soldered to said second temperature-sensing unit.

17. The optical module as defined in claim 14, wherein:
said second temperature-sensing unit is fixedly bonded to said filter holder.

18. The optical module as defined in claim 1, wherein:
said second temperature-sensing unit is disposed between a top face and a bottom face of said optical filter.

19. The optical module as defined in claim 1, further comprising:
a package that houses said light-emitting device, wavelength monitor device and wavelength regulating unit, wherein
said second temperature-sensing unit is disposed between said optical filter and one side of the package.

20. The optical module as defined in claim 1, further comprising:
a filter holder on which said optical filter is disposed, said filter holder includes a gold plated strut configured to control placement of wires within the optical module.

21. A optical transmitter comprising:
an optical module having
a light-emitting device configured to output a laser beam,
a first temperature-sensing unit disposed adjacent to the light-emitting device so as to sense a temperature of said light-emitting device,
an optical filter positioned to receive and filter at least a component of the laser beam,
a wavelength monitor device configured to monitor a wavelength of the laser beam and output a signal associated with monitored light at the wavelength,
a wavelength regulating unit configured to regulate the wavelength of the laser beam that is output from said light-emitting device based on said signal from the wavelength monitor device, wherein at least a portion of said wavelength monitor device being in contact with said wavelength regulating unit, and
a second temperature-sensing unit disposed adjacent to said optical filter so as to sense a temperature of said optical filter;
a control unit configured to control said wavelength regulating unit so as to fix the wavelength of the laser beam outputted from said light-emitting device at a predetermined locked wavelength, based on the signal outputted from said wavelength monitor device; and
a correcting unit configured to input the signal of the temperature sensed by said second temperature-sensing unit and to output a correction signal to said control unit, said correction signal being operative to correct the control signal outputted from said control unit for a correction of any deviation in said locked wavelength associated with the temperature characteristic in said optical filter.

22. The transmitter as defined in claim 21, wherein:
said wavelength regulating unit is adapted to regulate the wavelength of said light-emitting device by regulating a temperature of said light-emitting device.

23. The transmitter as defined in claim 21, wherein:
said wavelength regulating unit is adapted to regulate the wavelength in said light-emitting device by regulating a current injected into said light-emitting device.

24. The transmitter as defined in claim 23, further comprising:
an optical output monitoring unit configured to monitor an optical output of the laser beam output from said light-emitting device; and
an optical attenuation regulating unit configured to control said optical output to be constant, based on the optical output monitored by said optical output monitoring unit.

25. The transmitter as defined in claim 21, wherein:
said wavelength monitor device comprises
a beam splitter configured to divide said laser beam into two laser beam components, and
two photo detectors each positioned to receive respective of said two laser beam components and each configured to photo electrically transform each component into respective electric signals which form the signal that is output from said wavelength monitor device, wherein
said optical filter is disposed between at least one of said two photo detectors and the beam splitter.

26. The transmitter as defined in claim 25, wherein:
said control unit includes an analog/digital converter that converts the electric signals outputted from said two photo detectors into digital signals.

27. The transmitter as defined in claim 26, wherein:

optical filter has a predetermined thermistor resistance; and said control unit is configured to vary a photo diode current ratio of currents output from the two photo diodes via a linear relationship with said thermistor resistance so as to compensate for temperature dependent wavelength drift of said laser beam.

28. The transmitter as defined in claim 21, wherein:

said control unit comprises
two transformers configured to transform respective currents from first said two photo detectors into corresponding voltage signals,
a comparator configured to compare said corresponding voltage signals with each other and output at least one of a difference and a ratio between said corresponding voltage signals as a control signal, and
a current generator that is configured to output a temperature control current for the temperature control unit so as to regulate the temperature in the at least one of the light-emitting device and the wavelength monitoring device based on the control signal from said comparator.

29. The transmitter as defined in claim 21, wherein:

said correcting unit is configured to correct the deviation in said locked wavelength associated with the temperature characteristic of said optical filter by applying a predetermined voltage corresponding to the temperature of said optical filter to said control unit so as to offset a voltage signified in said control signal by said predetermined voltage.

30. The transmitter as defined in claim 21, further comprising:

an injection current control unit configured to receive a signal outputted from a power monitor photo detector that receives the laser beam from said light-emitting device, and said injection current control unit configured to control a current injected into said light-emitting device, based on the signal outputted from the power monitor photo detector.

31. The transmitter as defined in claim 30, wherein:

said wavelength monitor device includes said power monitor photo detector to produce said signal associated with said wavelength.

32. The transmitter as defined in claim 21, wherein:

said correcting unit includes a variable attenuator that is controllably configured to adjust a signal level output of said optical filter.

33. The transmitter as defined in claim 32, wherein:

said correcting unit includes an optical-output detecting unit that detects the signal level of the signal from the optical filter and adjusts an amount of attenuation from said variable attenuator so as to control an output level from the variable attenuator.

34. A WDM transmitting device comprising:

a plurality of optical transmitting devices configured to output to a common optical fiber respective optical signals at different wavelengths, each of said plurality of said transmitting devices including an optical module having a light-emitting device configured to output a laser beam, a first temperature-sensing unit disposed adjacent to the light-emitting device so as to sense a temperature of said light-emitting device, an optical filter positioned to receive and filter at least a component of the laser beam, a wavelength monitor device configured to monitor a wavelength of the laser beam and output a signal associated with monitored light at the wavelength, a wavelength regulating unit configured to regulate the wavelength of the laser beam that is output from said light-emitting device based on said signal from the wavelength monitor device, wherein at least a portion of said wavelength monitor device being in contact with said wavelength regulating unit, and a second temperature-sensing unit disposed adjacent to said optical filter so as to sense a temperature of said optical filter, a control unit configured to control said wavelength regulating unit so as to fix the wavelength of the laser beam outputted from said light-emitting device at a predetermined locked wavelength, based on the signal outputted from said wavelength monitor device; and a correcting unit configured to input the signal of the temperature sensed by said second temperature-sensing unit and to output a correction signal to said control unit, said correction signal being operative to correct the control signal outputted from said control unit for a correction of any deviation in said locked wavelength associated with the temperature characteristic in said optical filter.

35. The WDM transmitting device as defined by claim 34, further comprising:

a multiplexer configured to multiplex the respective optical signals into the common optical fiber.

36. An optical module comprising:

a light-emitting device configured to output a laser beam, said light-emitting device being positioned at a first location;

means for sensing a temperature of said light-emitting device;

means for filtering at least a component of the laser beam;

means for monitoring a wavelength of the laser beam at a second location and for outputting a signal indicative of the wavelength, said second location being different than said first location;

means for regulating the wavelength of the laser beam that is output from said light-emitting device based on said signal from said means for monitoring a wavelength of the laser beam; wherein at least a portion of said means for monitoring being in contact with said means for regulating, and means for sensing a second temperature of said means for filtering, the signal of the temperature sensed by said means for sensing a second temperature being used to correct the signal outputted from said means for monitoring a wavelength of the laser beam.

37. The optical module as defined in claim 36, wherein:

said means for regulating includes means for regulating the temperature at said first location and regulating the temperature at the second location.

38. The optical module as defined in claim 37, wherein:

said means for regulating takes into account an amount of temperature regulation applied at said first location when determining an amount of temperature regulation to be applied at said second location.

39. The optical module as defined in claim 36, wherein:

said means for regulating includes means for locking a wavelength of the laser beam produced by said light emitting device by accounting for both an operating temperature of the light emitting device and temperature-dependent characteristics of an optical component used by said means for monitoring.

40. An optical transmitter comprising:

an optical module having
a light-emitting device configured to output a laser beam, said light-emitting device being positioned at a first location,
means for sensing a temperature of said light-emitting device,
means for filtering at least a component of the laser beam;
means for monitoring a wavelength of the laser beam at a second location and for outputting a signal indicative of the wavelength, said second location being different than said first location,
means for regulating the wavelength of the laser beam that is output from said light-emitting device based on said signal from said means for monitoring a wavelength of the laser beam, wherein at least a portion of said means for monitoring being in contact with said means for regulating,
means for sensing a second temperature of said means for filtering;
means for controlling said means for regulating so as to fix the wavelength of the laser beam outputted from said light-emitting device at a predetermined locked wavelength, based on the signal outputted from said means for monitoring; and means for correcting to input the signal of the temperature sensed by said means for sensing a second temperature and to output a correction signal to said means for controlling, said correction signal being operative to correct the control signal outputted from said means for controlling for a correction of any deviation in said locked wavelength associated with the temperature characteristic in said means for filtering.

41. The optical transmitter as defined in claim 40, wherein:

said means for regulating includes means for regulating the temperature at said first location and regulating the temperature at the second location.

42. The optical transmitter as defined in claim 41, wherein:

said means for regulating takes into account an amount of temperature regulation applied at said first location when determining an amount of temperature regulation to be applied at said second location.

43. The optical transmitter as defined in claim 40, wherein:

said means for regulating includes means for locking a wavelength of the laser beam produced by said light emitting device by accounting for both an operating temperature of the light emitting device and temperature-dependent characteristics of an optical component used by said means for monitoring.

44. A WDM transmitting device comprising:

a plurality of optical transmitting devices configured to output to a common optical fiber respective optical signals at different wavelengths, each of said plurality of optical transmitting devices including an optical module having
a light-emitting device configured to output a laser beam, said light-emitting device being positioned at a first location,
means for sensing a temperature of said light-emitting device;
means for filtering at least a component of the laser beam;
means for monitoring a wavelength of the laser beam at a second location and for outputting a signal indicative of the wavelength, said second location being different than said first location,
means for regulating the wavelength of the laser beam that is output from said light-emitting device based on said signal from said means for monitoring a wavelength of the laser beam, wherein at least a portion of said means for monitoring being in contact with said means for regulating, means for sensing a second temperature of said means for filtering;
means for controlling said means for regulating so as to fix the wavelength of the laser beam outputted from said light-emitting device at a predetermined locked wavelength, based on the signal outputted from said means for monitoring; and means for correcting to input the signal of the temperature sensed by said means for sensing a second temperature and to output a correction signal to said means for controlling, said correction signal being operative to correct the control signal outputted from said means for controlling for a correction of any deviation in said locked wavelength associated with the temperature characteristic in said means for filtering.

45. The WDM transmitting device as defined in claim 44, wherein:

said means for regulating includes means for regulating the temperature at said first location and regulating the temperature at the second location.

46. The WDM transmitting device as defined in claim 45, wherein:

said means for regulating takes into account an amount of temperature regulation applied at said first location when determining an amount of temperature regulation to be applied at said second location.

47. The WDM transmitting device as defined in claim 44, wherein:

said means for regulating includes means for locking a wavelength of the laser beam produced by said light emitting device by accounting for both an operating temperature of the light emitting device and temperature-dependent characteristics of an optical component used by said means for monitoring.

48. A method for stabilizing a wavelength of a laser beam output from a light-emitting device, comprising steps of:

outputting a laser beam from the light-emitting device, said light-emitting device being positioned at a first location;

receiving and filtering at least a component of the laser beam by an optical filter;

monitoring a wavelength of the laser beam at a second location and outputting a signal indicative of the wavelength by a wavelength monitor device, said second location being different than said first location;

regulating the wavelength of the laser beam that is output from said light-emitting device based on said signal from said wavelength monitor device by a wavelength regulating unit; wherein at least a portion of said wavelength monitor device being in contact with said wavelength regulating unit; and sensing a second temperature of said optical filter, wherein the signal outputted from said wavelength monitor device being inputted into a control unit configured to control said wavelength regulating unit so as to fix the wavelength of the laser beam outputted from said light-emitting device at a predetermined locked wavelength, the signal of the second temperature sensed being inputted into a correcting unit configured to output a correction signal to said control unit so as to correct the control signal outputted from said control unit for a correction of any deviation in said locked wavelength associated with the temperature characteristic in said optical filter.

49. The method defined by claim 48, wherein:

said regulating step includes regulating the temperature at said first location and regulating the temperature at the second location.

50. The method defined by claim 49, wherein:

regulating step includes taking into account an amount of temperature regulation applied at said first location when determining an amount of temperature regulation to be applied at said second location.

51. The method defined by claim 48, wherein:

regulating step includes locking a wavelength of the laser beam produced by said light emitting device by accounting for both an operating temperature of the light emitting device and temperature-dependent characteristics of an optical component used in said monitoring step.

* * * * *